US010677881B2

(12) United States Patent
Magid

(10) Patent No.: US 10,677,881 B2
(45) Date of Patent: Jun. 9, 2020

(54) MAP ASSISTED INERTIAL NAVIGATION

(71) Applicant: The Government of the United States as represented by the Director, National Security Agency, Fort George G. Meade, MD (US)

(72) Inventor: Aaron D. Magid, Elkridge, MD (US)

(73) Assignee: Government of the United States as represented by Director National Security Agency

( * ) Notice: Subject to any disclaimer, the term of this patent is extended or adjusted under 35 U.S.C. 154(b) by 257 days.

(21) Appl. No.: 15/083,602

(22) Filed: Mar. 29, 2016

(65) Prior Publication Data

US 2017/0289771 A1   Oct. 5, 2017

(51) Int. Cl.
| | |
|---|---|
| *G01S 5/02* | (2010.01) |
| *H04W 4/33* | (2018.01) |
| *H04W 4/029* | (2018.01) |
| *G01C 21/20* | (2006.01) |
| *G01C 21/00* | (2006.01) |

(52) U.S. Cl.
CPC ............ *G01S 5/0257* (2013.01); *G01C 21/00* (2013.01); *G01C 21/206* (2013.01); *H04W 4/029* (2018.02); *H04W 4/33* (2018.02)

(58) Field of Classification Search
CPC .... H04W 4/043; H04W 64/006; H04W 88/02
See application file for complete search history.

(56) References Cited

U.S. PATENT DOCUMENTS

| | | | | |
|---|---|---|---|---|
| 6,374,216 | B1* | 4/2002 | Micchelli | G10L 15/063 704/231 |
| 9,687,180 | B1* | 6/2017 | Deninger | A61B 5/1123 |
| 10,303,697 | B1* | 5/2019 | Naegle | G06F 16/258 |
| 2005/0258957 | A1* | 11/2005 | Krumm | G01C 21/206 340/539.13 |
| 2010/0169026 | A1* | 7/2010 | Sorenson | G16B 30/00 702/20 |
| 2013/0245986 | A1* | 9/2013 | Grokop | H04M 1/72569 702/141 |
| 2013/0317944 | A1 | 11/2013 | Huang et al. | |

(Continued)

OTHER PUBLICATIONS

Googl Scholar Search Results.*

(Continued)

*Primary Examiner* — Qun Shen

(57) ABSTRACT

The present invention provides an improved method of pedestrian dead reckoning (PDR) and device for performing PDR. An image of the environment to be traversed by the pedestrian is used to define states associated with the PDR environment. The image is utilized to constrain error in the estimated location of the pedestrian. Pairs of states are identified and the characteristics of the defined states are utilized to define the probabilities of transitioning between states of the pair. Possible pedestrian events which may be observed are also defined and for each pair of states, the possibility of detecting an event given the state transition is determined. After detecting a series of events, the transition probabilities and the event probabilities are utilized to determine a state probability that the pedestrian is in a particular state at each particular time. Utilizing these state probabilities an estimated location is provided at each time.

33 Claims, 9 Drawing Sheets

(56) References Cited

U.S. PATENT DOCUMENTS

| | | | |
|---|---|---|---|
| 2015/0161516 A1* | 6/2015 | Ghassemzadeh | G06F 19/30 |
| | | | 706/12 |
| 2016/0205509 A1* | 7/2016 | Hopcraft | H04W 64/003 |
| | | | 455/456.1 |
| 2017/0270929 A1* | 9/2017 | Aleksic | G10L 15/26 |

OTHER PUBLICATIONS

NEON Sensor Fusion and Mapping Technology; TRX Systems; http://www.trxsystems.com/neon-technology.

SiRFusion SDK Android; CSR; http://www.csr.com/news/pr/2014/sirfusion-precise-indoor-location-tracking.

Thiagarajan, Arvind, et al.; VTrack: Accurate, Energy-aware Road Traffic Delay Estimation Using Mobile Phones; SenSys '09, Nov. 4-6, 2009; Berkley, USA.

* cited by examiner

MAP ASSISTED INERTIAL NAVIGATION

FIELD OF THE INVENTION

This invention is generally directed to a method and device for improving inertial navigation and pedestrian dead reckoning.

BACKGROUND OF THE INVENTION

Devices for pedestrian dead reckoning (PDR) and methods of PDR provide for the use of smart phone accelerometer and gyroscope data to determine the location of a user. Limited quality sensors and user variation often cause significant errors in the results obtained from PDR. Although, improvements to the accuracy of PDR can be made through the use of improved sensors, the use of improved sensors may not be feasible due to the lack of availability of the improved sensors or the increase in cost resulting from the use of improved sensors. Other attempts to improve PDR results require the use of additional sensors or devices such as compasses, barometers, GPS, microphones and WiFi. The use of these sensors is at times not feasible. For example, GPS devices cannot be utilized when the PDR environment is indoors. Thus, there is a need for improved PDR which utilizes the accelerometer and gyroscope sensors currently available in a smart phone and does not require the use of additional sensors or devices.

SUMMARY OF THE INVENTION

Briefly, the present invention discloses a method and device for estimating the position of a pedestrian in an environment. The invention utilizes an image representing the physical aspects of the environment to constrain error in the estimate. The image may be one of many typically readily available images of the environment, such as, for example, a map of a mall, a floor plan of a building, or a camera phone image of a fire-escape plan. After the image is processed, a set of states based upon the physical characteristics of the environment is identified. In addition a set of potential events to be undertaken by the pedestrian is identified. State transition probabilities and event probabilities are then calculated. As the pedestrian traverses the environment, a set of events are detected at regularly timed intervals. The transition probabilities and the event probabilities, along with information regarding the detected events are used to determine an estimated position of the pedestrian at each time interval.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which:

FIG. 1b illustrates a resulting image after application of morphological tools to the image of FIG. 1a;

FIG. 2b illustrates a resulting spine after application of morphological tools to the image of FIG. 2a;

DETAILED DESCRIPTION OF THE PREFERRED EMBODIMENT

Figure 1A:
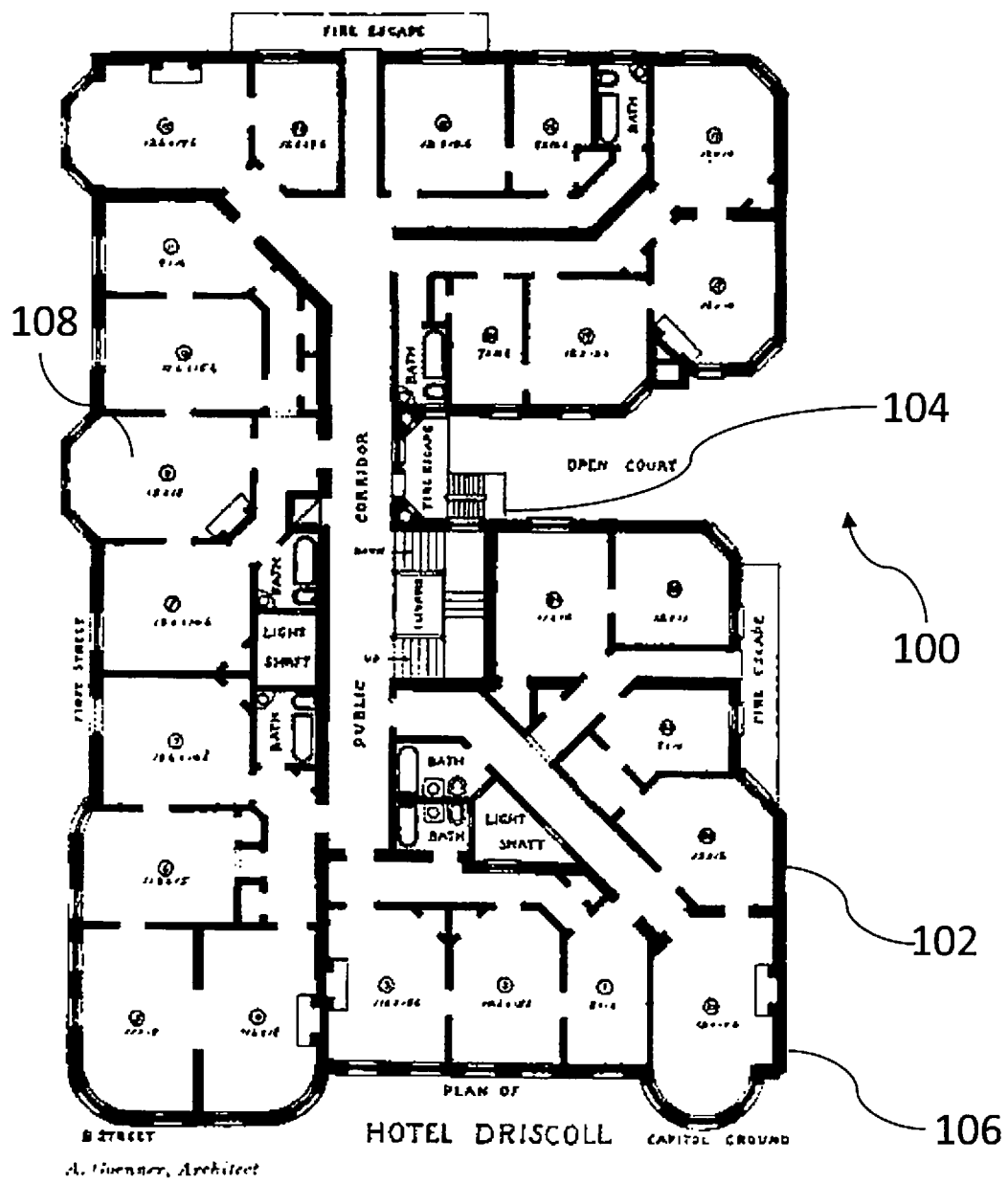
FIG. 1a illustrates an image of a PDR environment.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention provides a method of estimating the position of a pedestrian in an environment or an estimated path taken by a pedestrian and a device for providing such estimates. The steps of an embodiment of the method 300 of the present invention are illustrated in FIGS. 3a and 3b and an embodiment of the PDR device 400 is illustrated in FIG. 4.

Image Processing

Figure 3A:
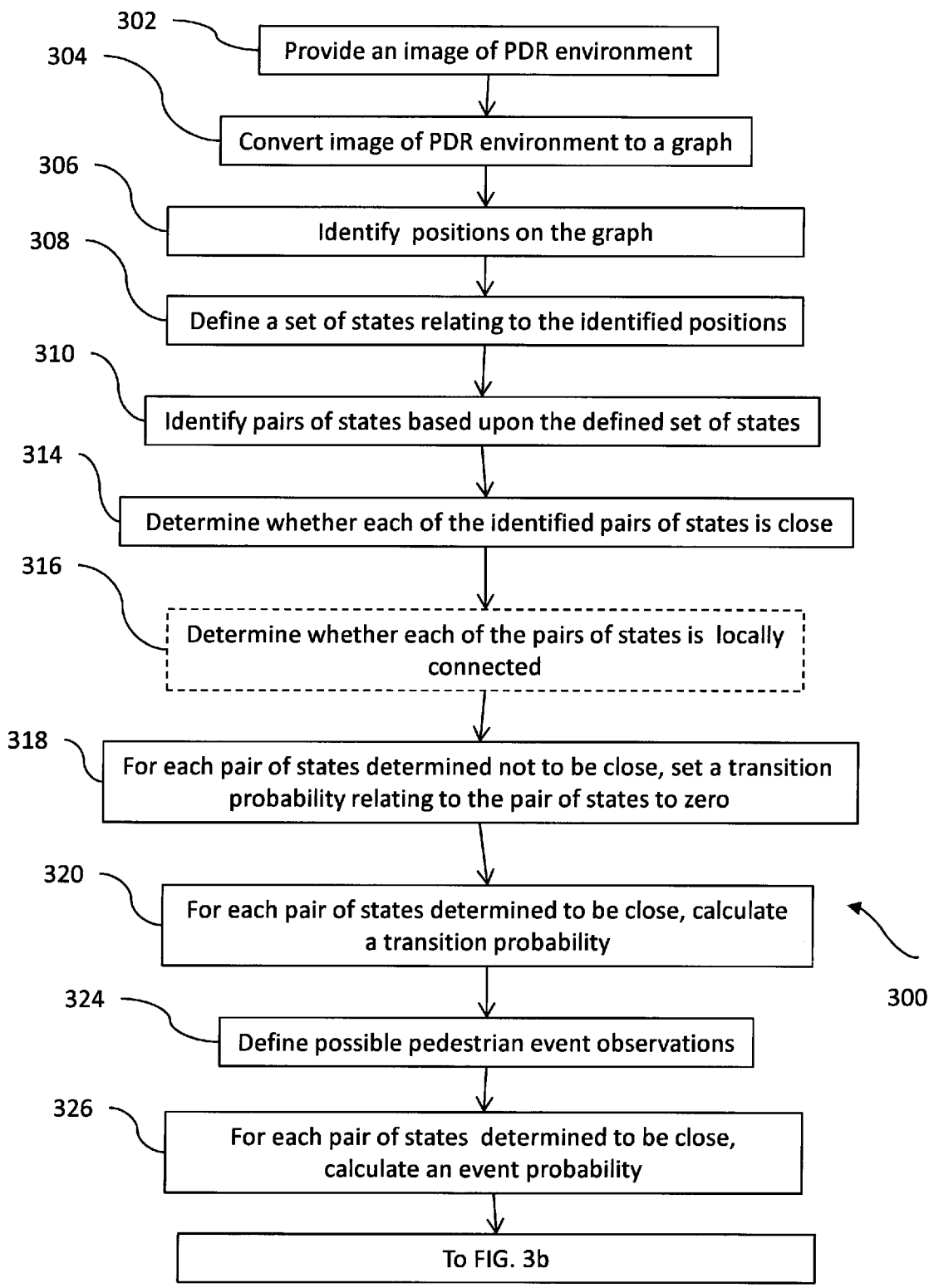
FIG. 3a illustrates a portion of the steps of the method of the present invention.
Figure 3B:
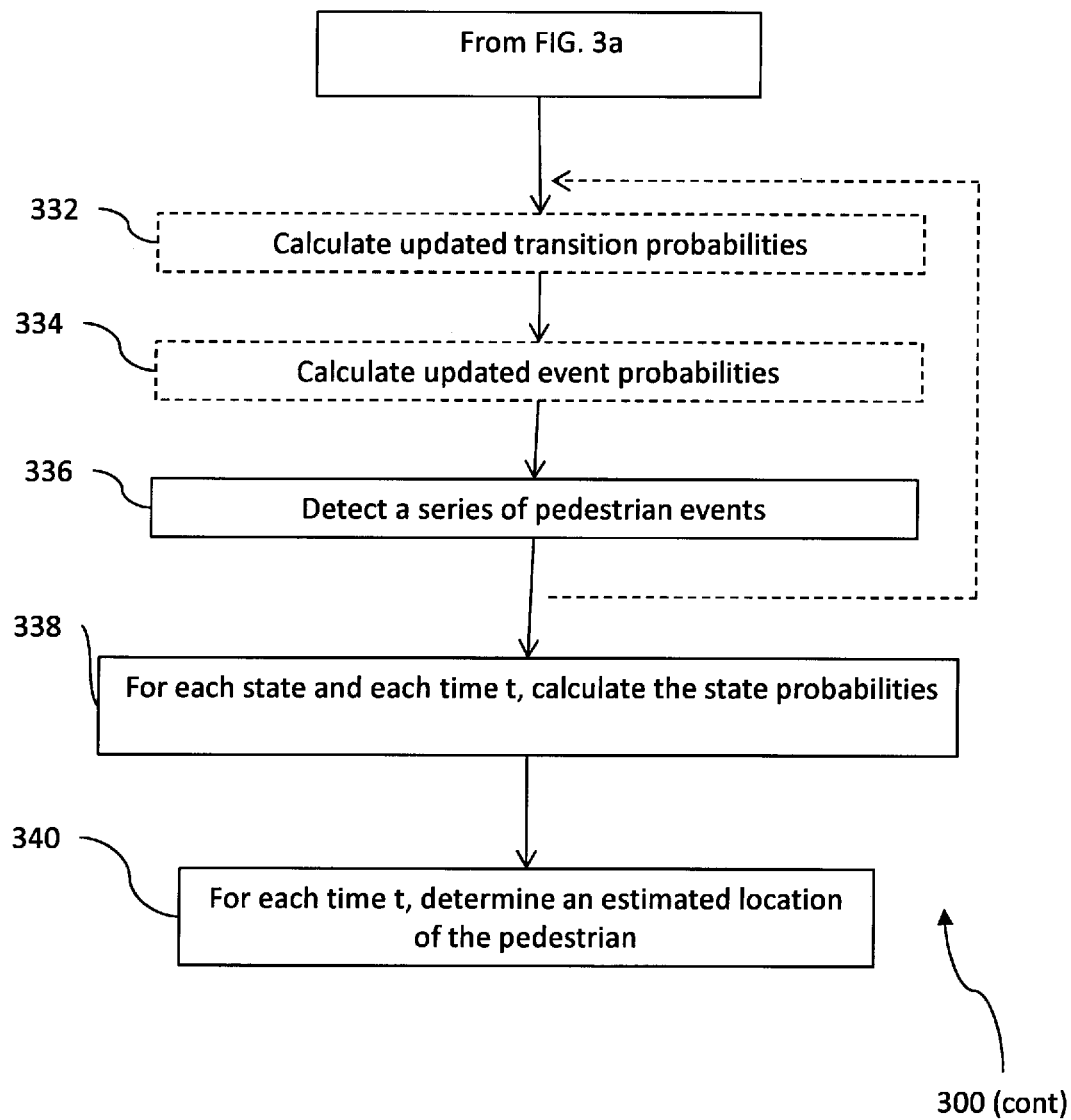
FIG. 3b illustrates the remaining steps of the method of the present invention.
Figure 4:
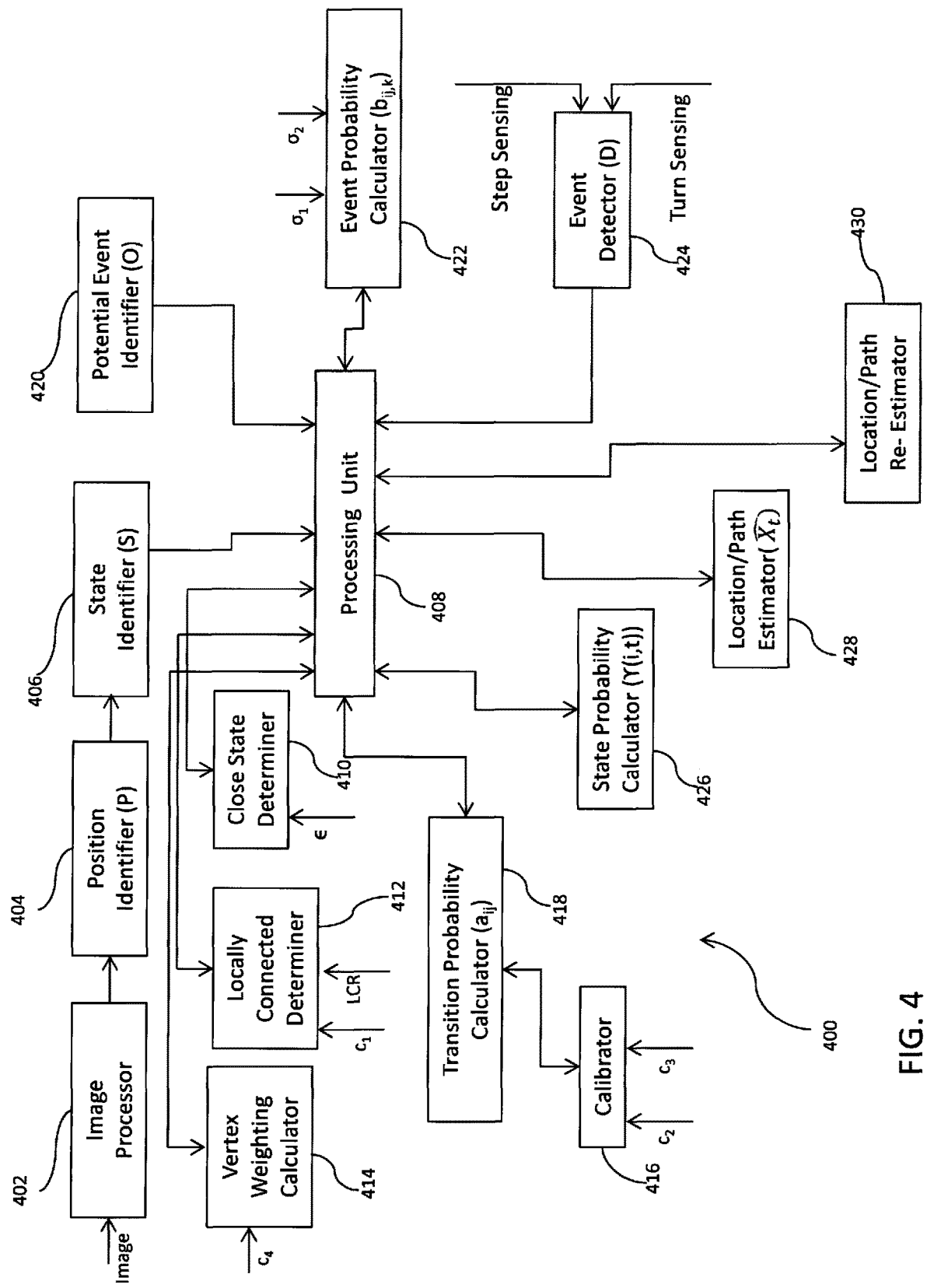
FIG. 4 illustrates an embodiment of a PDR device of the present invention.

As illustrated in the FIG. 3a, the method 300 of the present invention begins with the step 302 of providing an image of the environment which the pedestrian will be traversing; i.e., the PDR environment. The image may be, for example, a hotel floor plan such as the floor plan 100 illustrated in FIG. 1a. This image represents the physical characteristics of the environment to be traversed by the pedestrian. The floor plan 100 generally includes black regions representing physical structures in the environment such as, for example, walls 102 and staircases 104. The floor plan also includes black text notations 106 which do not represent physical characteristics of the environment but rather provide information about the environment. White regions 108 of the plan 100 generally indicate open space or walkable regions.

Next, at step 304, the image is converted to a mathematical graph representing the environment. Several processes are known for creating a mathematical graph from an image such as a floor plan. For example, a mathematical graph could be constructed using Canny edge detection. See, Canny, J., *A Computational Approach To Edge Detection*, IEEE Trans. Pattern Analysis and Machine Intelligence, 8(6):679-698, 1986. Another technique for creating a mathematical graph is provided using the morphological tools described in Gonzalez and Woods, *Digital Image Processing*, 2002. These processes provide for the conversion of the image to a black and white image, with white regions of the image defining walkable regions of the environment (e.g. corridors and the interior portions of rooms) and the black regions of the image defining unwalkable regions (e.g. walls).

Morphological tools may be used to clarify the walkable regions of the image. Such tools may provide, for example dilation (converting a pixel to black because it is surrounded by black pixels), erosion (converting a pixel to white because it is surrounded by white pixels), opening (erosion followed by dilation) or closing (dilation followed by erosion). These processes are useful for removing small objects in the middle of a hallway or closing small gaps in the walls. These small objects or gaps might result, for example, from dust in the picture, poor resolution of the image, text/room numbers printed on the image, or uneven thickness in the lines representing walls or doors, etc.

Morphological tools may be utilized in connection with the image of FIG. 1a, for example. Applying morphological tools results in the processed image 112 provided in FIG. 1b. As illustrated, the text notations 106 included in FIG. 1a have been consolidated such that each letter of the text notation no longer represents an obstacle, rather the text notation 106 has been consolidated and is represented by a single text block 114. Although the actual environment does not include an obstacle at the text block 114, the processed image illustrated in FIG. 1b simply provides a statistical model of the PDR environment. This model is sufficiently accurate to provide the desired information. Although precision in the mapping of the environment is not required, the more precise the mathematical graph is, the greater the accuracy the invention will achieve.

Figure 1B:
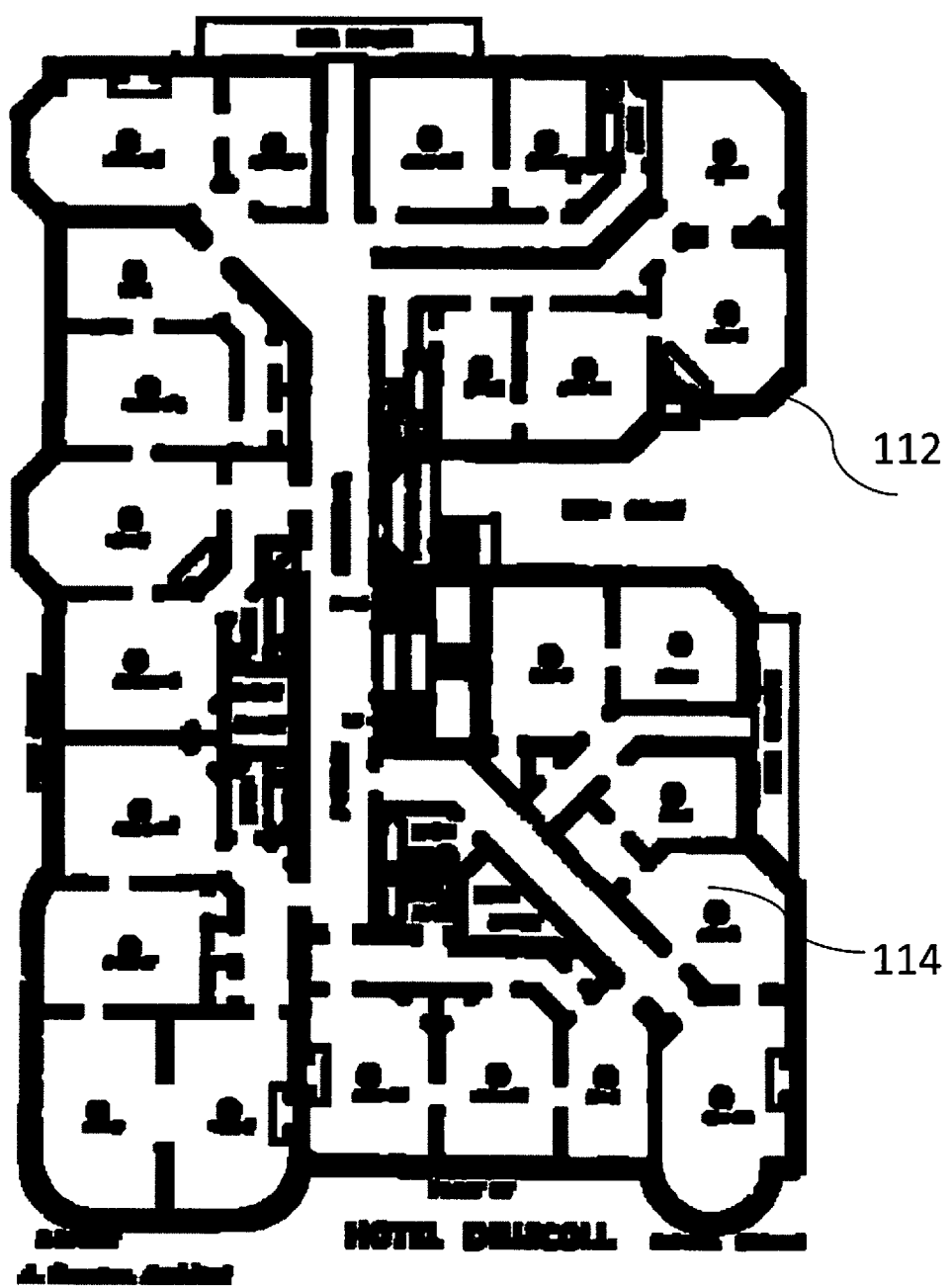
Figure 1C:
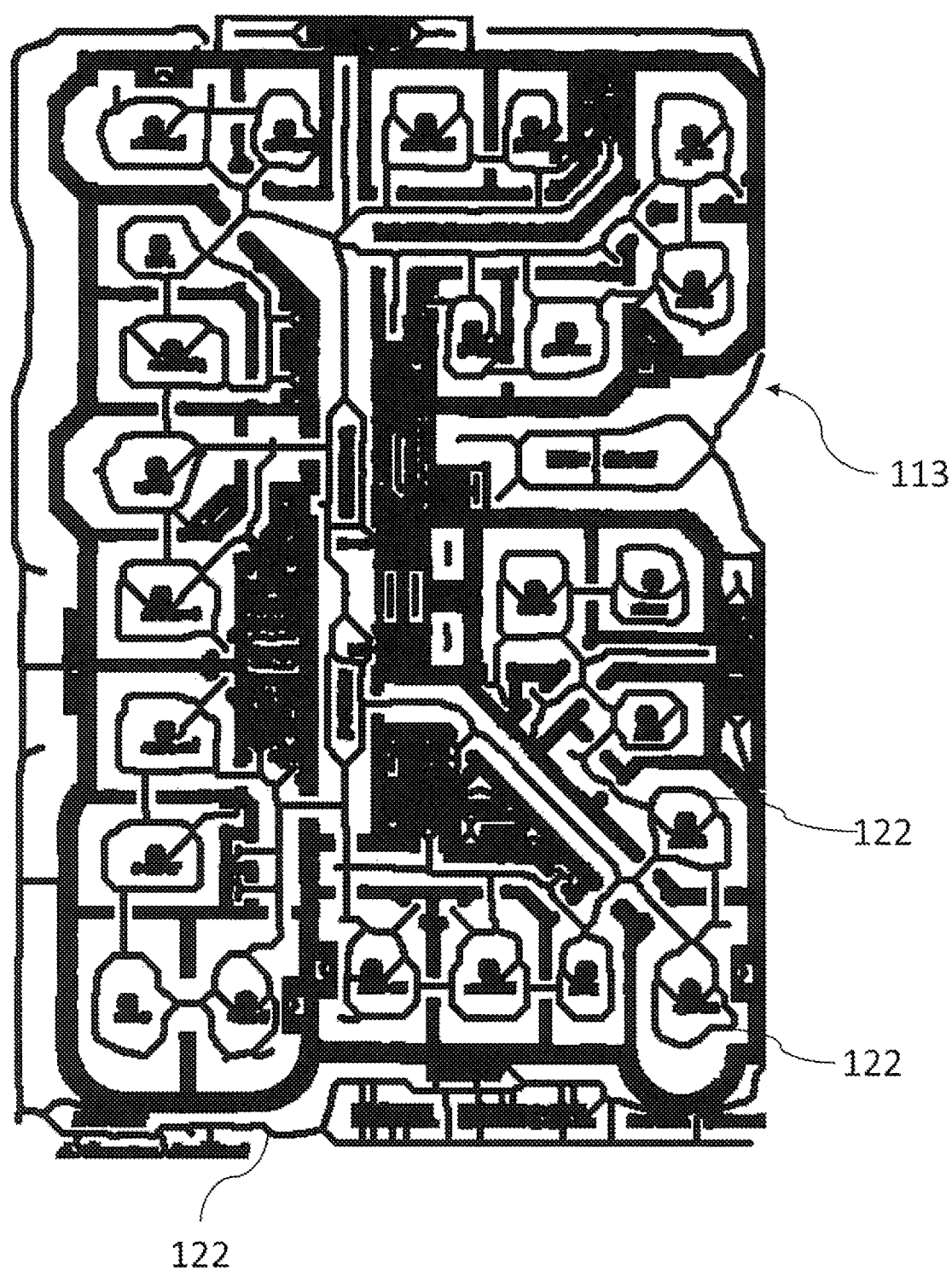
FIG. 1c illustrates a resulting spine after application of morphological tools to the image of FIG. 1b.

After application of the morphological tools to provide consolidation, a line tracing algorithm is applied to the processed image of FIG. 1b to create a spine image. FIG. 1c illustrates the spine image 113 which results from the processed image 112 of FIG. 1b. Application of the line tracing algorithm erodes the white region of the image in order to create a spine 122 throughout the map. The spine 122 resulting from the use of the line tracing algorithm has a width of a single pixel.

Figure 1D:
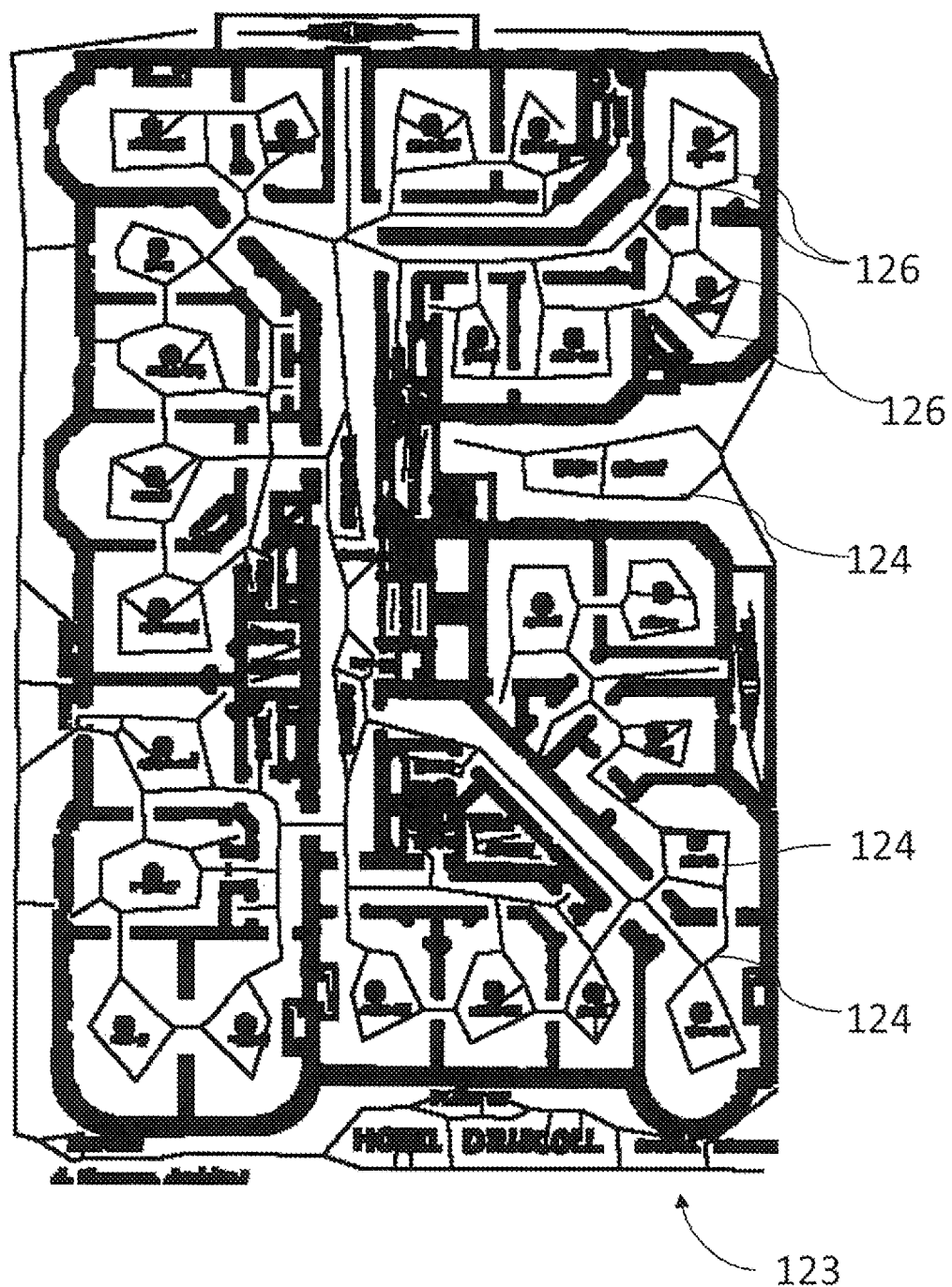
FIG. 1d illustrates a mathematical graph superimposed over the image of FIG. 1c.

Additional processing of the spine 122 provides a piecewise-linear approximation. As illustrated in FIG. 1d, a piecewise linear approximation 123 of the spine 122 of FIG. 1c is achieved by representing the spine 122 as a plurality of line segments 124 extending between pairs of vertices 126. By defining the graph as a piecewise linear approximation, the memory required to store the mathematical graph is reduced.

Figure 2A:
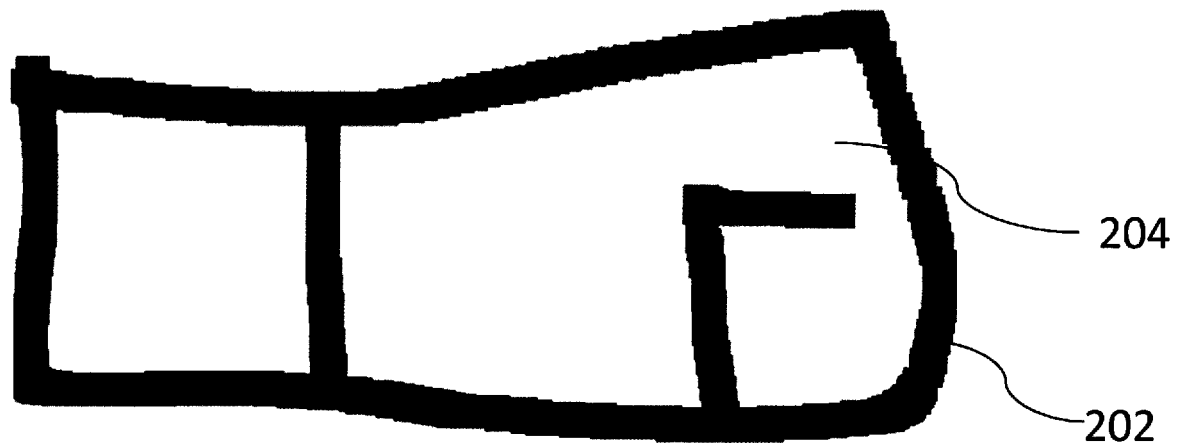
FIG. 2a illustrates an image of PDR environment.
Figure 2B:
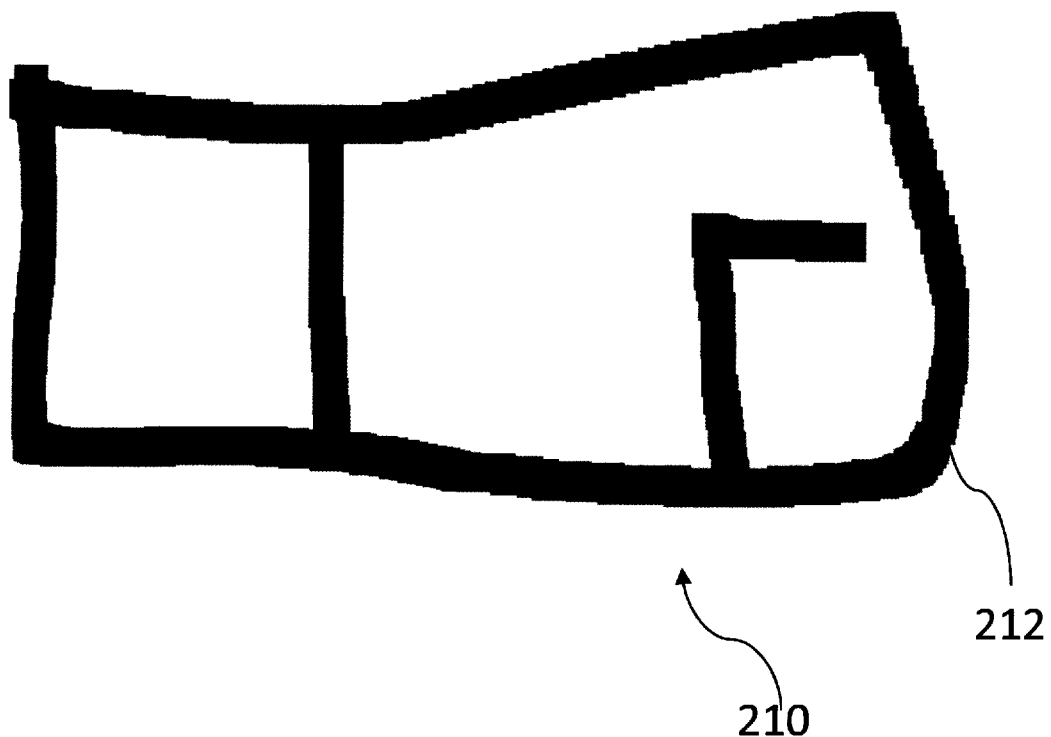
Figure 2C:
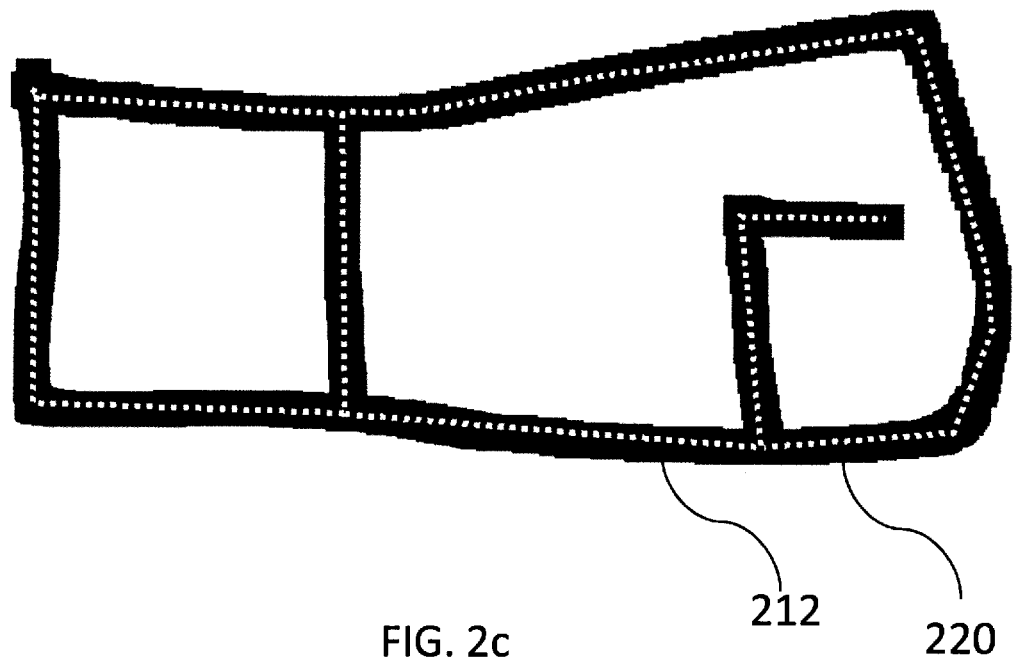
FIG. 2c illustrates a mathematical graph representing the image of FIG. 2b.

FIGS. 2a-2c illustrate the application of the morphological tools to an image of another PDR environment. FIG. 2a illustrates an image 200 of a simple PDR environment where the walkable region is defined by black space 202 and the unwalkable region or obstacles are represented by white space 204. Processing of the image 200 includes application of the line tracing algorithm to the image of FIG. 2a. A spine image 210 as illustrated in FIG. 2b results from application of the line tracing algorithm. The spine image 210 includes a spine 212 identified within in the walkable region 202 of the image 200 of FIG. 2a. As illustrated in FIG. 2c, a piecewise linear approximation is applied to the spine image of FIG. 2b. A piecewise linear graph 220 is provided and illustrated FIG. 2c and provides a mathematical graph of the image illustrated in FIG. 2a. The piecewise linear graph 220 is illustrated as a dotted line in FIG. 2c adjacent to the spine 212.

As illustrated in FIG. 4, the PDR device 400 includes an image processor 402. The image processor 402 receives the image of the PDR environment and provides a mathematical graph.

Identify Positions on the Graph

As noted in FIG. 3a, once the mathematical graph has been obtained, at step 306, positions on the graph are identified. More specifically, a collection, P, of equally spaced positions, p, on the mathematical graph are identified. As described below, the collection of positions, P, will be used to define the state of a pedestrian in the environment.

The spacing of the positions may be defined, for example, by an approximated step size of the pedestrian. The variable SS is used to define the distance associated with a single pedestrian step. This approximation can be identified, for example, through a calibration step. If the scale cannot be determined, an estimate may be used initially and subsequently refined in the re-estimation step as will be discussed below. Once the scale is established, a unit of measure is fixed. For example, the unit of measure may be meters or SS. In the embodiments described below, the unit of measure is established as meters. Additionally, the positive x and y-axes must be identified. In the embodiments described below, pixel-labeling convention is utilized and provides that x increases in the "right" direction and y increases in the "downward" direction. Thus, a typically oriented image in which North is identified as up provides that an x-axis extending to the right represents East and a downwardly extending y-axis represents South. It is understood that although use of a particular convention has been described, any convention may be selected in accordance with the present invention. It is further understood that the term "pedestrian" is not intended to be limited to a person but rather includes any moving object traversing the environment such as, for example, a robot or a vehicle. In such scenarios, step or step size is understood to refer to a change in position.

Figure 2D:
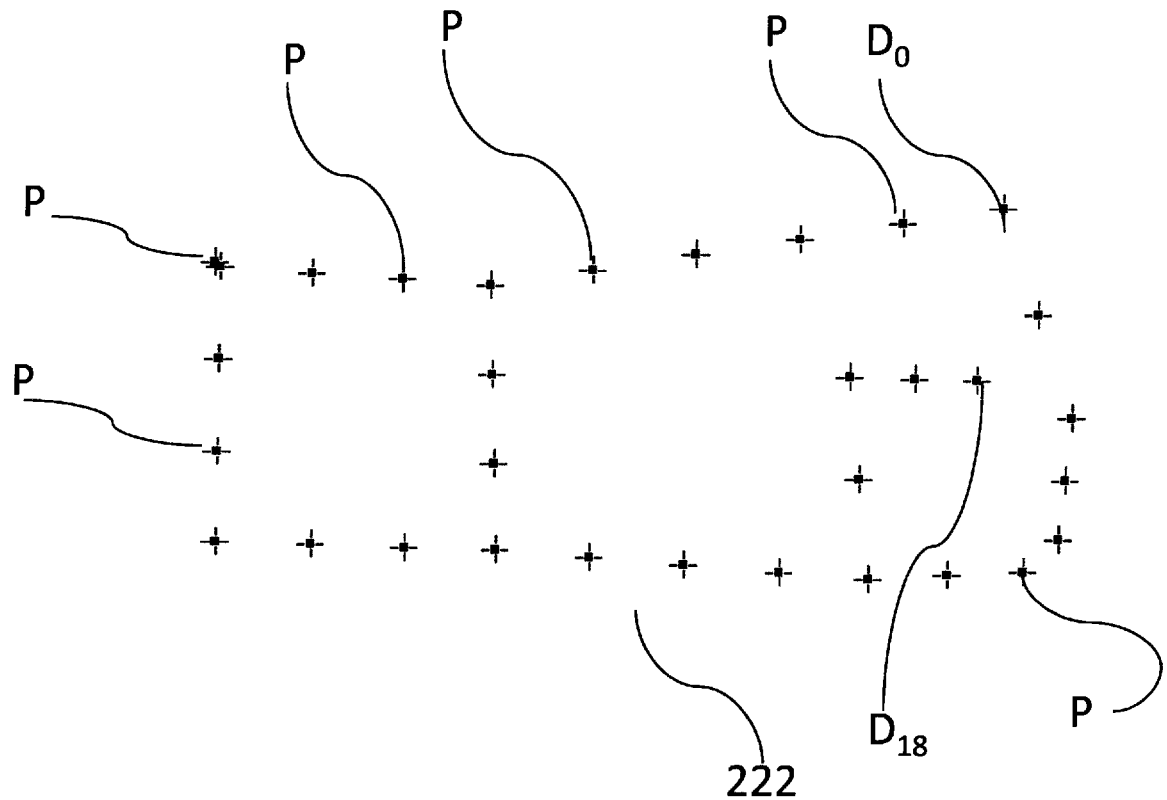
FIG. 2d illustrates identified positions on the mathematical graph of FIG. 2c.

Returning to the identification of positions on the mathematical graph, the number of positions provided by each segment can be approximated by dividing the length of the segment by the step size. To calculate the length of a segment, the Euclidean (straight-line) distance/length is determined using the following:

$$d((x_1,y_1),(x_2,y_2)) = \sqrt{((x1-x2)^2 + (y1-^2)^2)}$$

where the xy-coordinates refer to the plane of pixels in the image. Once a scale has been established, the length may be converted to any units desired. FIG. 2d illustrates an example of a mathematical graph 222 including equally spaced positions, p, identified from the segments illustrated in FIG. 2c. As illustrated in FIG. 2d, thirty-two (32) positions have been defined from the mathematical graph of FIG. 2c. The set of positions on the graph will be identified as P, $P=p_1 \ldots p_N$.

As illustrated in FIG. 4, the PDR device 400 includes a position identifier 404. The position identifier 404 receives the mathematical graph from the image processor 402 and as discussed provides a collection, P, of equally spaced positions, p, on the mathematical graph.

Defining States

Referring back to FIG. 3a, at step 308, using the collection of positions, P, a collection, S, of possible states, s, is identified. $s_i$ is used to denote an arbitrary state. Each possible state, s, is identified by a position and an orientation (i.e. oriented positions). Each oriented position represents a position, p, on the graph having (x,y) coordinates and an orientation, z, of the pedestrian at that position. Alternatively, rather than using coordinates to define the positions, p, pixel labels may be used. Orientations may be selected, for example, from a group representing 90 degree increments of orientation, i.e., $z \in \{0, 90, 180, 270\}$. Alternatively, other orientation increments could be used, such as for example, $z \in \{0, 45, 90, 135, 180, 225, 270, 315\}$. Utilizing the positions and orientations, a collection of N possible states $S=\{s_1, \ldots, s_N\}$ is provided and a state number is assigned to each state.

As noted above, the graph of FIG. 2d includes 32 positions. Orientations for each state are selected from the group $z \in \{0, 90, 180, 270\}$. Thus, 128 states (32×4) are associated with the graph of FIG. 2d. Table 1 provides a partial list of the 128 states associated with the graph of FIG. 2d. Each state is assigned a state number for reference purposes.

TABLE 1

Partial List of Defined States

| [x coord, y coord, orientation] | State Number, q |
|---|---|
| [824, 75, 0] | 0 |
| [824, 75, 90] | 1 |
| [824, 75, 180] | 2 |
| [824, 75, 270] | 3 |
| [730, 89, 0] | 4 |
| [730, 89, 90] | 5 |
| [730, 89, 180] | 6 |
| [730, 89, 270] | 7 |
| [634, 104, 0] | 8 |
| [634, 104, 90] | 9 |
| [634, 104, 180] | 10 |
| [634, 104, 270] | 11 |
| [538, 118, 0] | 12 |
| [538, 118, 90] | 13 |
| [538, 118, 180] | 14 |
| [538, 118, 270] | 15 |
| [442, 133, 0] | 16 |
| [442, 133, 0] | 16 |
| [442, 133, 90] | 17 |
| [442, 133, 180] | 18 |
| [442, 133, 270] | 19 |
| [346, 147, 0] | 20 |
| [346, 147, 90] | 21 |
| [346, 147, 180] | 22 |
| [346, 147, 270] | 23 |
| [260, 100, 0] | 24 |
| [260, 100, 90] | 25 |
| [260, 100, 180] | 26 |
| [260, 100, 270] | 27 |
| [348, 230, 0] | 28 |
| [348, 230, 90] | 29 |
| [348, 230, 180] | 30 |
| [348, 230, 270] | 31 |
| [845, 190, 0] | 32 |

As illustrated in FIG. 4, the PDR devices includes a state identifier 406. The state identifier 406 receives the collection of positions P from the position identifier 404 and provides a collection, S, of possible states, s to a processing unit 408. The processing unit 408 stores information regarding the collection of positions P.

The Hidden Markov Model

The collection of possible states and indirect observations of the pedestrian's movements provided by the sensors as described below, are utilized in a hidden Markov model to estimate the actual state of the pedestrian in the environment.

As the pedestrian moves through the environment, a sequence of states $(X_0, X_1, X_2, \ldots X_T)$ is traversed. Each state X provides an oriented position, p. Each oriented position consists of coordinates on the graph (x,y) along with an orientation, z. The set D represents detected events detected by the sensors and indicating the state of the pedestrian. More specifically $D_0 \ldots D_T$ represents the events detected at various times. As the pedestrian moves through the environment, a sequence of actual states $(X_0, X_1, X_2, \ldots X_T)$ is traversed. These actual states, however, are unknown.

In a Markov model, the probability of being in a particular state at a particular time is determined. The probability of being at a particular state at time t only depends on the state at t-1. In a hidden Markov model a collection of states is traversed, but the states which are traversed are unknown. In this invention a hidden Markov model is used and events are detected identifying the step(s) and turn(s) made by the pedestrian. These detected events do not identify the states but rather reflect transitions between states. The hidden Markov model is used therefore, to estimate the state of the pedestrian at a given time.

In order to distinguish between the actual state of the pedestrian and the estimated state of the pedestrian provided by the model, additional notation is used. Specifically, as noted above, s is used to denote potential states of the pedestrian and $X_t$ identifies the actual state of the pedestrian at time t, although this state is unknown. An estimated state of the pedestrian, $\widehat{X_t}$ is computed for each $X_t$. For example, if it is determined that the estimated state of the pedestrian at time t is $s_j$ ($\widehat{X_t} = s_j$), the expectation is that $X_t = s_j$.

Defining the Transition Probability

As noted above, a hidden Markov model is used to estimate the location of the pedestrian. Specifically, the model requires the initialization of a transition matrix, A, whose entries $a_{ij}$ define the probability of transitioning from state i to state j. For example $A=(a_{ij})$, where $a_{ij}=P(X_t=s_j|X_{t-1}=s_i)$. Specifically, $a_{ij}$ is the probability that the pedestrian is in the jth state at time t given that the pedestrian was in the ith state at time t-1.

Assigning/Calculating Transition Probabilities

As noted above, each state, s, represents a position and an orientation. For example, $s_i$ represents a position and an orientation $(x_i, y_i; z_i)$ of a first state and $s_j$ represents another position and an orientation $(x_j, y_j; z_j)$ of a second state. Referring to FIG. 3a, at step 310, the possible pairs of states $(s_i, s_j)$ are determined. For each pair, the probability of transitioning from the first state to the second state, $a_{ij}$, is assigned. These probabilities associated with transitioning from each state to every other state are assigned and collected in transition matrix A. A number of methods exist for determining the transition probabilities, $a_{ij}$. An example of one method is described herein. Additionally, it is to be understood that the transition probabilities, $a_{ij}$, may be determined empirically.

Close and Local Connectivity

The invention provides that the probability of transitioning between states in part depends upon whether the positions associated with the states are "close". In an embodiment of the present invention, the probability of transitioning between states also in part depends upon whether the positions associated with the states are "locally connected". The term "close" is used to identify the distance between positions in an absolute sense (i.e., as the crow flies). The term "locally connected" is used to identify the distance between positions along a path of travel that is restricted to the graph. For example, two positions $p_i$, $p_j$ of the graph may be a short distance from each other as the crow flies and therefore are found to be close. If however, a wall exists between the positions, a pedestrian must travel around to the wall to get from $p_i$ to $p_j$. If the path the pedestrian must travel is sufficiently long, the states associated with positions $p_i$ and $p_j$ will not be considered locally connected.

At step 314, it is determined whether each of the identified pairs of states is close. For example, if the distance $d(p_i, p_j) < \in$, positions $p_i$ and $p_j$ are determined to be close. The closeness parameter, $\in$, must be set. A reasonable choice for $\in$, for example, is the maximum distance one could travel in the time frame between observations. For example, if we allow for accelerometer measurements to detect 0, 1 or 2 steps per second, then $\in=3*SS$, is a reasonable choice.

As illustrated in FIG. 4, the PDR device 400 includes a close state determiner 410. The close state determiner is in communication with the processing unit 408 which provides the collection of states S to the close state determiner 410. A closeness parameter, $\in$, is selected by the user and also provided to the close state determiner 410. For each pair of states, the close state determiner 410 provides a determination as to whether the pair of states is close.

If a determination of local connectivity will be used in determining the transition probabilities, at step 316, it is determined whether each of the identified pairs of states is locally connected. Several methods can be used to determine local connectivity of states. Two methods of determining local connectivity are described herein. Each method for determining local connectivity requires selection of a local connectivity ratio (lcr). The local connectivity ratio (lcr) is ≥1 and describes how much further we are willing to travel along the graph compared to the straight-line distance between two points to consider them locally connected. As described below, the local connectivity ratio, lcr, may be used in different manners to determine local connectivity.

Consider two positions $p_i$ and $p_j$. Under a first method (LCR1) of determining local connectivity, any two positions on the same line segment of a graph are locally connected. For two positions on different segments of the graph, local connectivity must be determined. $d_1$ is selected to be the Euclidean distance between positions $p_i$ and $p_j$. $d_2$ is selected to be the sum of the lengths of the line segments joining positions $p_i$ and $p_j$, utilizing the subset of line segments which provides the lowest sum. Set a threshold LCR1. If $d_2 \leq LCR1*d_1$, then the states associated with the positions $p_i$ and $p_j$ are locally connected. If not, the states associated with the positions are not locally connected. An example is provided where LCR1 is set to 3.5 and $d_1$ for the positions $p_i$ and $p_j$ equals 2. If the shortest path on the graph between these two positions, $d_2$, is 7.0, the states associated with positions $p_i$ and $p_j$ are locally connected, however if the shortest path on the graph, $d_2$, is 7.1, then the states associated with positions $p_i$ and $p_j$ are not locally connected.

In a second method (LCR2) of determining local connectivity, we draw an auxiliary line segment, l, joining $p_i$ to $p_j$. The length of l is $d_1$. For each point on l, draw a perpendicular to l, $l_p$, of length $d_1$/lcr with the midpoint of $l_p$ on l. That is we construct a rectangle about l whose ratio of length to width is LCR2. If any one of the perpendiculars, $l_p$, does not intersect the graph, it is determined that the states associated with the two positions, $p_i$ to $p_j$, are not locally connected. Stated alternatively, if all perpendiculars, $l_p$, intersect the graph $p_1$ and $p_2$ are locally connected. It is to be understood that the discrete points on line segment, l, do not need to be determined. Rather, the intersection of lines may be determined for a range of values.

Heuristically, the first method for determining local connectivity is designed to capture how much longer the path required to be walked by the pedestrian to reach pj from pi is relative to the Euclidean distance. States found not locally connected using the second method (LCR2) implies the states are not locally connected using the first method (LCR1) where LCR1 and LCR2 are related by a geometric formula explained further below (although possibly for a different value of LCR since the LCR plays a different role in each method). Utilizing the second method, LCR2, if two states are found to be not locally connected, the perpendicular that does not meet the graph implies that there is an obstruction around which the pedestrian must traverse to reach $p_j$ from $p_i$. Because any path on the graph must go around this obstruction the sum of the length of the line segments between $p_j$ and $p_i$ is at least LCR1=($\sqrt{1+(LCR2)^2}$))/(LCR2) as long as the length of l. There are, however, examples where the second method could determine positions to be locally connected while the first method does not. It is noted that the first method for determining local connectivity requires an expensive computation to determine the shortest distance between two positions on the graph. The second method for determining local connectivity provides the advantage that this expensive computation is avoided.

As illustrated in FIG. 4, the PDR device 400 optionally includes a locally connected determiner 412 in communication with the processing unit 408. The locally connected determiner 412 if utilized, receives information regarding the close states identified by the close state determiner 410 and a local connectivity ratio (LCR) provided by the user. For each pair of states identified as close, the locally connected determiner 412 determines whether the pair of states is locally connected.

Referring to FIG. 3a, at step 318, for each pair of states in which the position associated with the state i and the position associated with the state j are not close as defined above, the probability of transitioning from state i to state j is set to zero ($a_{ij}=0$). The transition probability associated with those states which are close but not locally connected will be lower than the transition probability of states which are close and locally connected. Because the probability of transitioning from a first state to a second state will be set to zero for all state pairs not close, the matrix A will likely be sparsely populated. Because the matrix is sparsely populated, as discussed below, the amount of memory and runtime needed to calculate, the location of the pedestrian, $X_t$, at time, t, will be reduced.

At step 320, a transition probability must be calculated for each pair of states which are found to be close. In the absence of other information to estimate the true probabilities $a_{ij}$ of transitioning from state i to state j, constants $c_1$, $c_2$, $c_3$, and $c_4$ are utilized to assign values based on formula a priori.

The locally connected constant, $c_1$, reflects whether the states are locally connected. The locally connected constant, $c_1$, may be utilized in determining the transition probabilities. If the locally connected constant is not utilized, c1 is set to 1.0. If the locally connected constant is to be utilized, two potential values are selected for the locally connected constant $c_1$. If the states $s_i$ and $s_j$ are found to be locally connected, the locally connected constant $c_1$ is set to the first value. If the states $s_i$ and $s_j$ are not found to be locally connected, the locally connected constant $c_1$ is set to the second value. For example, the first value for $c_1$ may be selected to be 1.0 and the second value for $c_1$ may be selected to be 0.1. In this example, if the states $s_i$ and $s_j$ are found to be locally connected, $c_1$ will be set 1.0. In the event states $s_i$ and $s_j$ are not found to be locally connected, $c_1$ will be set 0.1. The ratio of the values selected for the locally connected constants $c_1$ reflects the confidence in the accuracy of the graph. As noted above, in some cases the graph does not accurately depict the physical characteristics of the environment. For example, in some instances the graph may not depict doorways in the environment. If the confidence in the accuracy of the graph is low, then the potential values for c1 are chosen to be closer together (e.g. 0.5 and 0.8). By choosing values close together, the local connectivity determination is not too heavily weighted in the determination of $a_{ij}$. When the local connectivity determination is not heavily weighted, the model allows for a higher probability of transitions existing in the environment that do not appear on the graph.

The vertex constant $c_4$ is designed to weight the probability of a turn more heavily when a person reaches an intersection on the map. An auxiliary point $(x_m, y_m)$ is defined as a point that is a distance $c_4$ directly in front of $(x_i, y_i)$. $c_4$ determines how far in front of $(x_i, y_i)$ the auxiliary point $(x_m, y_m)$ is placed and $(x_m, y_m)$ determines the mean of a normal distribution on distance. The position of $(x_m, y_m)$ may be found to be $(x_m, y_m)=(x_i+c_4*\sin(z_i), y_i-c_4*\cos(z_i))$. Two potential values are selected for the constant $c_4$. If the state $s_i$ is positioned at a vertex on the graph, the constant $c_4$ is set to the first value. If the state $s_i$ is not positioned at a vertex on the graph, the constant $c_4$ is set to the second (larger) value. For example, in the case where the state $s_i$ is a non-vertex (i.e. a state that does not lie at an intersection of two line segments) the value of $c_4$ might be set to 0.8*SS to center the distribution near a state almost 1 step in front of $s_i$. And, in the case where the state $s_i$ is posited at a vertex, $c_4$ might be set to 0.2*SS to make the probability of staying in the same position larger which will increase the probabilities of a transition to a state with the same position and different orientation (i.e. turns). Again, how the value for $c_4$ is chosen may depend on behavioral calibration and/or the confidence in the graph accurately depicting the environment.

With the position of the auxiliary point determined, the distance between $(x_j, y_j)$ and $(x_m, y_m)$, w, can be determined and the difference between the orientation $z_j$ and $z_i$, r, can be determined. To determine r, the shorter difference in direction between the orientation $z_j$ and $z_i$ is selected so that the value lies in the range −180 to 180.

As illustrated in FIG. 4, the PDR device 400, includes a vertex weighting calculator 414. The vertex weighting calculator 414 receives state information from the processing unit 408. The vertex weighting calculator 414 also receives a vertex constant(s) c4 as designated by the user. Utilizing the vertex constant(s) c4 and state information, the vertex weighting calculator calculates the distance, w, and the difference in orientation, r, as discussed above.

Other parameters to be set are the distance calibration constant $c_2$ and the turn calibration constant $c_3$. The distance calibration constant $c_2$ reflects standard deviation for the normal distribution on distance. The turn calibration constant $c_3$ reflects standard deviation for the normal distributions on turns. $c_2$ and $c_3$ are chosen through calibration. For example, a pedestrian may take a sequence of calibrated steps and turns (i.e. known, for the sake of setting up their accelerometer and gyroscope), From that sequence a mean and variance step size and degrees turned may be determined.

As illustrated in FIG. 4, the PDR device 400 includes a calibrator 416. The calibrator 416 is in communication with the processing unit 408. The distance calibration constant, $c_2$, is selected by the user and provided to the calibrator 416. The turn calibration constant $c_3$ is also selected by the user and provided to the calibrator 416.

With the constants $c_1$, $c_2$, $c_3$, $c_4$, selected and w and r calculated, the probability of transitioning from state i to state j, $a_{ij}$, is provided by:

$$a_{ij}=c_1*e^{-(w)^2/2(c_2)^2}*e^{-(r)^2/2(c_3)^2}$$

As noted above, for all state pairs determined not to be close the probability of transition between those states is set to zero. For all remaining state pairs $a_{ij}$ is calculated as noted above. The calculated transition probabilities $a_{ij}$ are collected in a matrix A. These values are normalized so that the rows in the matrix sum to 1.

Table 2 provides a portion of the normalized transition matrix, |A|, associated with states defined by the environment illustrated in FIG. 2d. For example, in row 3, the probability of transitioning from state 3 to state 0 (i.e., making a right turn) is 0.11. The probability of transitioning from state 3 to state 7 (i.e., stepping forward) is 0.13. It is noted that for the sake of brevity, several rows and columns are omitted from the transition matrix, A. In addition, for the sake of clarity, "zero" entries are included in the transition matrix A. It is to be understood, however, that the zero entries are eliminated for the purpose of storing the matrix in sparse format.

TABLE 2

| Portion of Normalized Matrix Aij (128 × 128) | | | | | | | | | | | | | | | | |
|---|---|---|---|---|---|---|---|---|---|---|---|---|---|---|---|---|
| State# | 0 | 1 | 2 | 3 | 4 | 5 | 6 | 7 | 8 | 9 | 10 | 11 | 12 | ... | 34 | 35 |
| 0 | 0.22 | 0.18 | 0.10 | 0.18 | 0.08 | 0.07 | 0.04 | 0.07 | 0.00 | 0.00 | 0.00 | 0.00 | 0.00 | | 0.01 | 0.02 |
| 1 | 0.18 | 0.22 | 0.18 | 0.09 | 0.03 | 0.04 | 0.03 | 0.02 | 0.00 | 0.00 | 0.00 | 0.00 | 0.00 | | 0.06 | 0.03 |
| 2 | 0.06 | 0.12 | 15.00 | 0.12 | 0.03 | 0.06 | 0.07 | 0.06 | 0.00 | 0.00 | 0.00 | 0.00 | 0.00 | | 0.11 | 0.09 |
| 3 | 0.11 | 0.06 | 0.11 | 0.14 | 0.11 | 0.06 | 0.11 | 0.13 | 0.02 | 0.01 | 0.02 | 0.02 | 0.00 | | 0.03 | 0.03 |
| 4 | 0.13 | 0.07 | 0.01 | 0.07 | 0.25 | 0.13 | 0.02 | 0.13 | 0.08 | 0.04 | 0.01 | 0.04 | 0.00 | | 0.00 | 0.00 |
| 5 | 0.16 | 0.30 | 0.16 | 0.02 | 0.08 | 0.14 | 0.08 | 0.01 | 0.01 | 0.01 | 0.01 | 0.00 | 0.00 | | 0.01 | 0.00 |
| 6 | 0.01 | 0.04 | 0.08 | 0.04 | 0.02 | 0.13 | 0.25 | 0.13 | 0.01 | 0.07 | 0.12 | 0.07 | 0.00 | | 0.01 | 0.01 |
| 7 | 0.01 | 0.00 | 0.10 | 0.01 | 0.01 | 0.06 | 0.01 | 0.06 | 0.12 | 0.13 | 0.02 | 0.13 | 0.25 | | 0.00 | 0.00 |
| 8 | 0.01 | 0.01 | 0.00 | 0.01 | 0.13 | 0.07 | 0.01 | 0.07 | 0.25 | 0.13 | 0.02 | 0.13 | 0.08 | | 0.00 | 0.00 |
| 9 | 0.05 | 0.09 | 0.05 | 0.01 | 0.13 | 0.25 | 0.13 | 0.02 | 0.06 | 0.12 | 0.06 | 0.01 | 0.00 | | 0.00 | 0.00 |
| 10 | 0.00 | 0.00 | 0.00 | 0.00 | 0.01 | 0.04 | 0.08 | 0.04 | 0.02 | 0.13 | 0.25 | 0.13 | 0.01 | | 0.00 | 0.00 |
| ... | | | | | | | | | | | | | | | | |
| 34 | 0.00 | 0.01 | 0.02 | 0.01 | 0.00 | 0.00 | 0.00 | 0.00 | 0.00 | 0.00 | 0.00 | 0.00 | 0.00 | | 0.45 | 0.24 |
| 35 | 0.06 | 0.01 | 0.06 | 0.12 | 0.01 | 0.00 | 0.01 | 0.02 | 0.00 | 0.00 | 0.00 | 0.01 | 0.00 | | 0.17 | 0.31 |

As illustrated in FIG. 4, the PDR device 400 includes a transition probability calculator 418. The transition probability calculator 418 is in communication with the processing unit 408. As described above, utilizing, the selected constants $c_1$, $c_2$, $c_3$, $c_4$, and calculated w and r calculated, the probability of transitioning from state i to state j, $a_{ij}$, is calculated by the transition probability calculator 418. The calculated transition probabilities are provided to the processing unit 408. The calculated transition probabilities may be provided to the processing unit 408 in the form of a matrix A.

As noted, possible orientations associated with a state may be provided in 90 degree increments (or some other discretization). In spite of this restriction on possible orientations, high probabilities may still be assigned for state transitions requiring a non-restricted transition. For example, if two states i and j lie on along an edge that is not horizontal (or due East) but instead go through points (0, 0) and (1.2, 0), a compass or gyroscope may not have the precision to track one's orientation that precisely. In this model, if state i is (0, 0; 90), state j is (1.2, 0.1; 90), then $a_{ij}$ would be a relatively high probability even though it is not directly due east of the origin. This allows the tracking of a pedestrian on paths that meet at arbitrary angles without detecting a turn.

Defining Possible Event Observations

As discussed above, the invention provides for the use of a device including an accelerometer and a gyroscope to detect movements of a pedestrian within an environment. The detected movements in turn are used to make observations regarding the pedestrian's movements (i.e., whether the pedestrian has stepped and/or turned).

At step 324, a set of potential event observations O is defined. Each potential event observation is defined as an ordered pair. The first number of the ordered pair represents the potential number of steps taken by the pedestrian and the second number of the ordered pair represents the potential degrees to which the pedestrian has turned, i.e., (number of steps, degrees turned). A potential number of steps taken and the potential degrees to which the pedestrian has turned are selected from pre-defined sets of values.

Table 3 illustrates an example of a set of potential event observations, O. In the example illustrated, steps are categorized as {0, 1, or 2} to identify no steps, one step or two steps respectively and turns are categorized as {0, 90, 180, 270} to represent turns in 90 degree increments. In such a case, these predefined sets of values provide the set O including twelve (12) possible event observations (i.e. L=12). Thus, a collection of potential event observations O is provided wherein O={$O_1$, . . . $O_{12}$.}. For example, one potential event observation is a step without a turn and is represented by the ordered pair (1, 0). Another potential event observation is a left turn without a step and is represented by the ordered pair (0,270).

TABLE 3

Potential Event Observations, O

| K= | (number of steps, degrees turned) |
|---|---|
| 0 | (0, 0) |
| 1 | (0, 90°) |
| 2 | (0, 180°) |
| 3 | (0, 270°) |
| 4 | (1, 0) |
| 5 | (1, 90°) |
| 6 | (1, 180°) |
| 7 | (1, 270°) |
| 8 | (2, 0) |
| 9 | (2, 90°) |
| 10 | (2, 180°) |
| 11 | (2, 270°) |

As illustrated in FIG. 4, the PDR device 400 includes a potential event identifier 420. The potential event identifier 420 is in communication with the processing unit 408. The potential event identifier 420 defines a set of potential event observations O as described above. Each potential event observation is defined as an ordered pair and provided to the processing unit 408.

Additional notation is used to distinguish potential event observations from detected events. The set of all potential event observations, O consists of potential event observations $o_1$, . . . $o_L$ and detected events are denoted $D_t$. The notation $o_k$, is used to denote an arbitrary potential event observation.

Defining Event Probabilities

The probability of observing events to be performed by the pedestrian, $b_{i \to j,k}$ (also written as $b_{i,j,k}$), must also be determined. Specifically, $b_{i,j,k}$ represents the probability of detecting that the pedestrian has performed an event, $o_k$, given the state transition from state $s_i$ to state $s_j$. Specifically $b_{i \to j,k} = P(D_t = o_k | X_{t-1} = s_i, X_t = s_j)$.

Assigning/Calculating Event Probabilities

The probabilities of detecting events may be collected in a matrix B. The matrix B is an $N^2 \times L$ matrix, representing the collection of assigned probabilities, $b_{i,j,k}$. For any row (i→j) of the matrix B where the transition probability is zero (i.e., $a_{ij}$=0), the event probability for the particular state transition is set to zero (i.e. $b_{i,j,k}$=0).

At step 326, for each pair of states i and j determined to be close (i.e., where $a_{ij} \neq 0$), the event probability, $b_{i,j,k}$ must be determined. Several methods for calculating the event probabilities, $b_{i,j,k}$, may be utilized. An example, of one method for calculating event probabilities is described herein. Additionally, the event probabilities, $b_{i,j,k}$, may be determined empirically.

In order to determine the event probability, the change required to transition from state i to state j is compared to the change provided by the potential observation, $o_k$. More specifically, the change in distance between $s_i$ and $s_j$ is computed as $\Delta_{i,j}$ and the change in orientation between $s_i$ and $s_j$ is computed as $\delta_{i,j}$ As before, in finding the difference in orientation, we take the shorter difference so the value lies in the range −180° to 180°. As noted above each observation is represented as an ordered pair (number of steps, degrees turned). The observation $o_k$, is represented by the ordered pair ($\Delta_k$, $\delta_k$) where $\Delta_k$ represents the difference in position that observation would produce (e.g. 0, 1, or 2 steps), and $\delta_k$ represents the difference in the orientation that observation would produce (e.g. amount turned).

The calculation of the event probability, $b_{i,j,k}$ also utilizes standard deviations $\sigma_1, \sigma_2$. These standard deviations are chosen empirically. For example, if events are detected using an accelerometer and gyroscope, then reliability of these sensors impacts the probability of detecting a step/turn when one has occurred. Lower reliability gives a larger variance in what observations might be detected for a given change in underlying state, which is what these variables represent in the formula below.

The event probability, $b_{i,j,k}$ is provided by:

$$b(i,j,k) = e^{(\Delta_k - \Delta_{ij})^2 / 2\sigma_1^2} * e^{-(\delta_k - \delta_{ij})^2 / 2\sigma_2^2}$$

As in the assigning values to the transition matrix A, the values in B should represent actual probabilities but before collecting any data, these probabilities must be assigned in a somewhat arbitrary way. Other information such as the confidence in the sensors will influence how the standard deviations $\sigma_1$, $\sigma_2$ are chosen, or whether another distribution model should be used instead.

The standard deviations, $\sigma_1$ and $\sigma_2$, will be selected depending on the confidence in the sensors. In the event there is a high degree of confidence as to the accuracy of the sensors, then the standard deviations, $\sigma_1$ and $\sigma_2$ may be set low. For example, if the states' orientations differ by 90 degrees and there is a high degree of confidence as to the accuracy of the sensors, the parameters $\sigma_1$, $\sigma_2$ are chosen such that the resulting probability of observing a 90 degree turn may be set at 99%, but the probability of observing the incorrect 0° or 180° turn may be set at 0.04%, and the probability of observing a 270° turn may be set at 0.02% (The term "incorrect" here means that the observation doesn't match the true change in state (e.g. that state changes from (x,y, 0) to (x,y,90) but a 180 degree turn is observed instead of the true 90 degree turn). If there is a low degree of confidence as to the accuracy of the sensors, the probabilities of observing a 90°, 0°, 180° or 270°, turns may be set respectively, for example, at 80%, 8%, 8% and 4%.

Next, the event probability matrix B is normalized so that the row sum is 1. Table 4 includes an example of entries provided in a normalized event probability matrix B.

TABLE 4

Portion of Normalized Event Probability B(i, j, k) (1282 X L)

| | k = 0 | k = 1 | k = 2 | ... |
|---|---|---|---|---|
| A(0, 0) = 0.22 | B(0, 0, 0) = 0.78643 | B(0, 0, 1) = 0.00874 | B(0, 0, 2) = 0.00000 | ... |
| A(0, 1) = 0.18 | B(0, 1, 0) = 0.01084 | B(0, 1, 1) = 0.97562 | B(0, 1, 2) = 0.01084 | ... |
| A(0, 2) = 0.10 | B(0, 2, 0) = 0.00000 | B(0, 2, 1) = 0.01087 | B(0, 2, 2) = 0.97826 | ... |
| . | . | . | . | ... |
| A(0, 7) = 0.07 | 0 | 0 | 0 | 0 |
| A(0, 8) = 0.000 | 0 | 0 | 0 | 0 |
| . | . | . | . | ... |
| A(1, 0) = 0.18 | B(1, 0, 0) = 1.01084 | B(1, 0, 1) = 0.00000 | B(1, 0, 2) = 0.01084 | ... |
| . | . | . | . | ... |
| A(3, 3) = 0.14 | B(3, 3, 0) = 0.78643 | B(3, 3, 1) = 0.00874 | B(3, 3, 2) = 0.00000 | ... |
| . | . | . | . | |

As illustrated in FIG. 4, the PDR device 400 includes an event probability calculator 422. The event probability calculator 422 is in communication with the processing unit 408. The event probability calculator 422 receives standard deviations, $\sigma_1$ and $\sigma_2$, as selected by the user. For each potential observation, the event probability calculator 422 calculates $b_{i \to j, k}$, i.e., the probability of detecting that the pedestrian has performed an event, $o_k$, given the state transition from state $s_i$ to state $s_j$.

Referring to FIG. 3b, step 332 provides for calculation of updated transition probabilities and step 334 provides for calculation of updated event probabilities. The optional steps 332 and 334 will be discussed below in connection with re-estimation.

Detecting/Observing Events

At step 336, pedestrian events are detected utilizing indirect observations of such events. A variety of devices may be utilized to detect pedestrian events such as steps and turns. Commonly available devices used to detect step and turn events are the accelerometer and gyroscope found in mobile telephone devices. Similar to the potential observations, O, each indirectly detected event, D, is represented by an ordered pair wherein the first number of the pair represents the number of steps indirectly observed as being taken by the pedestrian and the second number of the pair represents the indirectly observed degree to which the pedestrian has turned, i.e., (number of steps, degrees turned). The detected number of steps is identified, for example, as 0, 1 or 2, respectively indicating that the indirect observations indicate that the pedestrian has not stepped, has taken a single step, or has taken two steps. Alternatively, different numbers of detected steps can be represented. The detected degree to which the pedestrian has turned relative to a reference point is represented, for example, in ninety degree (90°) increments indicating that the indirect observations indicated a turn by the pedestrian. The detected 90 degree increments 0, 90, 180, and 270 for example, may respectively, indicate, orientations of north, east, south and west. Alternative increments of turns may be detected. For example, 45 degree increments could be detected representing orientations of North, North-East, East, South-East, South, South-West, West, and North-West.

A set of detected events, D, is detected and recorded. Table 5 provides an example of detected events recorded as a pedestrian walked through the PDR environment illustrated in FIG. 2d. As the pedestrian moves through the PDR environment, a sequence of events is detected and recorded ($D_0$, $D_1$, $D_2$, ... $D_T$). The initial detected event, $D_0$ is considered a special case and represents the initial position and orientation of the pedestrian. The initial position and orientation of the pedestrian is typically known. In the example illustrated in Table 5, the initial position of the pedestrian is the upper right-hand corner of the graph illustrated in FIG. 2d and the pedestrian is oriented facing west (left). This initial detected event, $D_0$, is represented in Table 5 as (824,75,270) and is noted in FIG. 2d. Subsequent detected events $D_t$ (i.e. $D_1$ through $D_{18}$) provide a record of detected events which occurred between time t−1 and time t. For example, $D_6$ is a record of the detected event occurring between time t=5 and time t=6. Referring to the graph illustrated in FIG. 2d and the detected events recorded in Table 5, the following events were detected and recorded: 5 steps, left turn, 3 steps, left turn, 4 steps, left turn, 2 steps, right turn, and 2 steps. The position of the pedestrian at t=18, $D_{18}$ is noted in FIG. 2d.

TABLE 5

Detected Events, D

| TIME | Observations<br>$D_0 = (x_0, y_0, z_0)$ (824, 75, 270)<br>$O_0$ = position, orientation at t = 0. |
|---|---|
| 1 | $D_1 = (1, 0)$ |
| 2 | $D_2 = (1, 0)$ |
| 3 | $D_3 = (1, 0)$ |
| 4 | $D_4 = (1, 0)$ |
| 5 | $D_5 = (1, 0)$ |
| 6 | $D_6 = (0, 270)$ |
| 7 | $D_7 = (1, 0)$ |
| 8 | $D_8 = (2, 0)$ |
| 9 | $D_9 = (0, 270)$ |
| 10 | $D_{10} = (1, 0)$ |
| 11 | $D_{11} = (1, 0)$ |
| 12 | $D_{12} = (1, 0)$ |
| 13 | $D_{13} = (1, 270)$ |
| 14 | $D_{14} = (1, 0)$ |
| 15 | $D_{15} = (1, 0)$ |
| 16 | $D_{16} = (0, 90)$ |
| 17 | $D_{17} = (1, 0)$ |
| 18 | $D_{18} = (1, 0)$ |

As illustrated in FIG. 4, the PDR device 400 includes an event detector 424. The event detector 424 receive step sensing information and turn sensing information and is in communication with the processing unit 408. Upon detecting step and turn events, the event detector 424 provides information regarding the events detected to the processing unit 408.

With the transition probabilities $a_{ij}$ and the event probabilities $b_{i,j,k}$ calculated, and the events detected, at step 338 the probabilities of the pedestrian being in each state at each time, Y(i, t) are calculated. The Baum-Welch algorithm can be used to compute the Y(i, t). Alternatively, one could use the model constructed thus far to apply the Viterbi algorithm to compute the most probable path taken by the user, that is, the most probable sequence of states traversed as opposed to the most probable state at each individual time.

Typically, the Baum-Welch algorithm provides an estimate of the actual state at a particular time based upon observations made about the state at each time. An embodiment of the present invention modifies the Baum-Welch algorithm by utilizing observations made regarding the transitions between states to estimate the state of a pedestrian at a given time. Specifically observations made at each time reflect an observation about an unknown state transition (a step and/or turn) and the model can still be used to provide an estimate as to the state of the pedestrian at each time t.

The Baum-Welch algorithm is sometimes referred to as a forward-backward algorithm and includes the use of alpha variables and beta variables. The alpha variables are computed forward in time and the beta variables are computed backward. i.e., $\alpha(i, t)$ depends on $\alpha(j,t-1)$ and $\beta(i, t)$ depends on $\beta(j,t+1)$. In the present invention, the values for $\alpha$ can be computed in real-time, i.e., as the events D are detected. Because the values for $\beta$, however, depend on data at a future time, the value of $\beta$ at a particular time must be computed subsequent to the collection of data at the later point in time.

Adaption of the Baum-Welch model for the present invention provides for the computation of three N×T arrays $\alpha$, $\beta$, $\gamma$ where N is the number of possible states and T the number of observations made.

The array a consists of the probabilities $\alpha(i, t)$. Each probability $\alpha(i, t)$ represents the probability that the pedestrian is in a state, i, at a particular time given the observations made up to that point. For example, $\alpha(i,0)$ represents the probability of the pedestrian being in state i at time 0. As noted above, it is assumed that the starting state of the pedestrian is known. Thus, where $i=X_0$, $\alpha(i,0)=1$ and for all other states $\alpha(i,0)=0$. In the event the starting state is unknown, a vector of probabilities could be placed on $\{\alpha(i,0)\}$. In another example, $\alpha(i,2)$ represents the probability of the pedestrian being in state i at time 2. Thus, $\alpha(i, t)$ depends upon the columns expressed in matrix A.

As we detect events, $D_1, \ldots D_t$, for each subsequent time, t, and for each possible state, i, the probability that the pedestrian is in state i at time t, $\alpha(i, t)$, is computed using:

$$\alpha(i, t) = \sum_k \alpha(k, t-1) a_{ki} b_{ki,o_t}$$

Where k represents a summation index over the set of states; i identifies the applicable column of the normalized matrix A; and $o_t$ represents the observation which occurred at time, t. In addition, for each time, t, a normalization value, $c_t$, is computed using the following formula in order to rescale the alpha array:

$$c_t = \sum_i \alpha(i, t)$$

Next, the array $\alpha(i, t)$ is rescaled the using:
$\alpha(i,t):=\alpha(i,t)/c_t$.

The rescaled $\alpha(i, t)$ represents the probability that the pedestrian is in state i, at time t, given the observation of events $D_1 \ldots D_t$ thus far; i.e., $P(X_t=s_i|D_1, \ldots D_t)$.

Note, the array $\alpha(i, t)$ is rescaled before incrementing t.

$\beta(i, t)$ represents the probability of detecting events $D\{t+1\}, \ldots D_T$, given that $X_t=s_i \ldots$ Wherein, T, represents the last time and t represents a generic time variable.

Compute $\beta(i, t)$ using:

$$\beta(i, t) = \sum_k \beta(k, t+1) a_{ik} b_{i \to k, o_{t+1}}$$

Where i identifies the applicable row of normalized matrix A and $o_{t+1}$ represents the observation which occurred at time, t+1.

Next, rescale $\beta(i, t)$ using $\beta(i, t)=\beta(i, t)/c_{t+1}$. It is noted that if rescaling does not occur, $\alpha(i, t)=P(X_t=s_i \& o_1, \ldots, o_t)$, $c_t=P(D_1, \ldots, D_t)$, and $\beta(i, t)=P(o_{t+1}, \ldots, o_T|X_t=s_i)$. Rescaling is utilized partially for machine precision reasons, and the rescaled, $\alpha(i, t)$ represents $P(X_t=s_i|o_1, \ldots, o_t)$ (i.e. the probability of being in state i at time t, given the event detection to that point). Note all probabilities are based on the model. In addition, the rescaling helps compute $\gamma$ because with the rescaled $\alpha,\beta$, we simply have a product.

At step 338, for each state and each time, the state probabilities are calculated. The state probability array $\gamma$(i, t), represents the collection of state probabilities at each time, i.e., for each time, t, the probability that the pedestrian is in a particular state i, given the full set of events detected. The state probability array $\gamma$(i, t), is computed for each state using:

$\gamma(i,t)=\alpha(i,t)\beta(i,t)$

As illustrated in FIG. 4, the PDR device 400 includes a state probability calculator 426. The state probability calculator 426 is in communication with the processing unit 408. For each time, t, the state probability calculator calculates the probability that the pedestrian is in a particular state, given the set of events detected $\gamma$(i, t).

At step 340, for each time t, an estimated location of the pedestrian is determined. Specifically, using the state probability array $\gamma$(i, t) for each time t, the probabilities can be compared and the highest probability Max $\gamma$(i, t) is selected for each time t. Table 6 illustrates an estimated location of the pedestrian at time t (i.e.; $\widehat{X_t}$) wherein $\widehat{X_t}$ is determined by selecting the highest probabilities Max$\gamma$(i, t) calculated at each time. For example, the maximum probability $\gamma$ (i, t) calculated at time t=5 was 0.9916. The state associated with the probability 0.9916 is [346,147, 270] which has been identified in Table 1 as state 23.

As illustrated in FIG. 4, the PDR device 400 includes a location/path estimator 428. The location/path estimator 428 is in communication with the processing unit 408. As discussed above, utilizing the state probabilities calculated by the state probability calculator 426, the location/path estimator 428 provides an estimated location of the pedestrian.

Note that the Baum Welch algorithm can take up to on the order of $N^2$ T work and memory. Since this model uses sparse matrices, however, the work and memory are only on the order of N*T. This approximation can be translated to "runtime" which is dependent upon the efficiency of the particular computer used.

TABLE 6

Estimated Location of the Pedestrian

| Time, t | Max γ (i, t) | $\widehat{X_t}$ |
|---|---|---|
| 0 | 1 | (824, 75; 270) |
| 1 | 0.9997 | (730, 89; 270) |
| 2 | 0.9997 | (634, 104; 270) |
| 3 | 0.9995 | (538, 118, 270) |
| 4 | 0.9986 | (442, 133; 270) |
| 5 | 0.9916 | (346, 147,; 270) |
| 6 | 0.9489 | (346, 147; 180) |
| 7 | 0.9491 | (348, 230; 180) |
| 8 | 0.9436 | (352, 393; 180) |
| 9 | 0.9177 | (352, 393; 90) |
| 10 | 0.8668 | (440, 400; 90) |
| 11 | 0.8573 | (528, 407; 90) |
| 12 | 0.8411 | (616, 414; 90) |
| 13 | 0.6475 | (699, 420; 0) |
| 14 | 0.5270 | (690, 327; 0) |
| 15 | 0.5182 | (681, 232; 0) |
| 16 | 0.4441 | (681, 232; 90) |
| 17 | 0.3656 | (742, 234; 90) |
| 18 | 0.3538 | (800, 235; 90) |

Reestimating the Model

If desired, the model may be refined by again using the Baum-Welch algorithm. Re-estimation begins by computing the probability that $X_t$ and $X_{t+1}$ are the ith and jth states respectively, given the set of observations; i.e., $\delta(i, j, t)$ represents $P(X_t=s_i \text{ and } X_{t+1}=s_j | D_1 \ldots D_T)$. $\alpha, \beta, \gamma$ along with the previous values of $\alpha$ and $\beta$ are used to update the entries of $\alpha$ and $\beta$. The new $\alpha$ and $\beta$ constitute a new model and can be used to reiterate the Baum-Welch algorithm on the same or new data as follows:

$$\delta(i, j, t) = \frac{\alpha(i, t-1)\beta(j, t)a_{ij}b_{i \to j, o_t}}{c_t}$$

where $a_{ij}$ is the previously calculated transition probability and $b_{i \to j, o_t}$ is the previously calculated event probability.

As indicated in FIG. 3b, optionally at step 332 the transition probability is updated to provide updated transition probability $a_{ij}^*$. Updated transition probability $a_{ij}^*$ may be calculated using:

$$a_{ij}^* = \frac{\Sigma_t \delta(i, j, t)}{\Sigma_{k,t} \delta(i, j, t)}$$

As indicated in FIG. 3b, optionally at step 334 the event probability is updated to provide updated event probability $b_{i \to j,k}^*$. Updated event probability $b_{i \to j,k}^*$ may be calculated using:

$$b_{i \to j,k}^* = \frac{\Sigma_{\{t | o_t = o_k\}} \delta(i, j, t)}{\Sigma_t \delta(i, j, t)}$$

As with the previous calculations of probability, the re-estimation requires only the sum over i and j for which $a_{ij} \neq 0$. The new matrices A and B will be as sparse as the previous matrices.

The steps 332 and 334 of updating the transition probabilities and event probabilities may be performed as many times as desired but typically once or twice per set of observations is sufficient to update the model without over-fitting. Although more iterations will fit the observations better, "over-fitting" the observations is not desirable because the results will not necessarily apply to future observations.

As illustrated in FIG. 3b, once the transition probabilities and the event probabilities have been updated, the process continues at step 336 and a series of pedestrian events is detected in the same manner as discussed above. At step 338 state probabilities are calculated as discussed above, however, the calculation provides for the use of the updated transition and event probabilities. Specifically, using $a_{ij}^*$ and $b_{i \to j,k}^*$, $\alpha$, $\beta$, and Y are re-calculated using the Baum-Welch algorithm to provide the state probabilities.

The process then proceeds to step 340 where the estimated location of the pedestrian, $\widehat{X_t}$, can be determined utilizing, $\widehat{X_t} = \text{argmax}_t(i, t)^w$; where w represents the number of times which the transition probabilities and event probabilities have been re-estimated. For example, $\widehat{X_t} = \text{argmax}_i (i, t)^5$ represents the most likely state at time t, after 5 re-estimations of the transition and event probabilities. Depending on the application, if desired, one could also track the probabilities themselves, $\max_i(i, t)$.

As illustrated in FIG. 4, the PDR device 400 includes a location/path re-estimator 430. The location/path estimator 430 is in communication with the processing unit 408. As discussed above, utilizing the updated state probabilities calculated by the state probability calculator 426, the location/path estimator 430 provides a re-estimated location of the pedestrian.

As noted above, the accelerometers and gyroscopes provided in mobile telephone may provide inaccurate information. Tables 7 and 8 illustrate the effectiveness of the invention despite these inaccuracies. Table 7 illustrates two recordings of a series of detected events $D_1 \ldots D_{18}$. The underlying true states are the same during each recording. In the first recording the events were correctly detected by the sensors (i.e. if you were to trace the path described by the observations using no probabilistic model, the traced path and the path of the pedestrian would match. In the second recording, however the inaccuracy of the sensors results in an inaccurate recording of the events (i.e. the path traced by the second set of observations would not match the path of the pedestrian). Specifically the events recorded at time t=3 and time t=9 are inaccurate in the second recording. At time t=3 for example, in the "correct" detection, the sensors detected the event as, (1,0), i.e., one step and no turn. At time t=3 in the "incorrect" detection, the sensors detected the event as (0,0) i.e., no steps and no turn. Further, at time t=9 in the "correct" detection, the sensors detected the event as, (1,270), i.e., one step and left turn. At time t=9 in the "incorrect" detection, the sensors detected the event as (0,0) i.e., no steps and no turn.

TABLE 7

Detected Events, D

| TIME | Event Detection Correct<br>$D_0 = (x_0, y_0, z_0)$<br>(824, 75, 270)<br>$O_0$ = position,<br>orientation at t = 0. | Event Detection Incorrect<br>$D_0 = (x_0, y_0, z_0)$<br>(824, 75, 270)<br>$O_0$ = position,<br>orientation at t = 0. |
|---|---|---|
| 1 | $D_1 = (1, 0)$ | $D_1 = (1, 0)$ |
| 2 | $D_2 = (1, 0)$ | $D_2 = (1, 0)$ |
| 3 | $D_3 = (1, 0)$ | $D_3 = (1, 0)$ |
| 4 | $D_4 = (1, 0)$ | $D_4 = (1, 0)$ |
| 5 | $D_5 = (1, 0)$ | $D_5 = (1, 0)$ |
| 6 | $D_6 = (0, 270)$ | $D_6 = (0, 270)$ |
| 7 | $D_7 = (1, 0)$ | $D_7 = (1, 0)$ |
| 8 | $D_8 = (2, 0)$ | $D_8 = (2, 0)$ |
| 9 | $D_9 = (0, 270)$ | $D_9 = (0, 270)$ |
| 10 | $D_{10} = (1, 0)$ | $D_{10} = (1, 0)$ |
| 11 | $D_{11} = (1, 0)$ | $D_{11} = (1, 0)$ |
| 12 | $D_{12} = (1, 0)$ | $D_{12} = (1, 0)$ |
| 13 | $D_{13} = (1, 270)$ | $D_{13} = (1, 270)$ |
| 14 | $D_{14} = (1, 0)$ | $D_{14} = (1, 0)$ |
| 15 | $D_{15} = (1, 0)$ | $D_{15} = (1, 0)$ |
| 16 | $D_{16} = (0, 90)$ | $D_{16} = (0, 90)$ |
| 17 | $D_{17} = (1, 0)$ | $D_{17} = (1, 0)$ |
| 18 | $D_{18} = (1, 0)$ | $D_{18} = (1, 0)$ |

Table 8 illustrates the estimated location of the pedestrian provided by the invention utilizing the "correct" observations provided in Table 7 along with the associated probability for each time t. Table 8 also includes a re-estimated location of the pedestrian utilizing the "correct" observations provided in Table 7. It is noted that the initially provided estimated locations and the re-estimated locations are the same. After re-estimation, however, the probabilities associated with the estimated locations increases.

TABLE 8

Re-estimated Location of the Pedestrian Using "Correct" Observations

| Time, t | $\widehat{X_t}$-Estimated Location | Max γ(i, t) | $\widehat{X_t}$-Estimated Location After re-estimation | Max γ(i, t) |
|---|---|---|---|---|
| 0 | (824, 75; 270) | 1 | (824, 75; 270) | 1 |
| 1 | (730, 89; 270) | 0.9997 | (730, 89; 270) | 1.0000 |
| 2 | (634, 104; 270) | 0.9997 | (634, 104; 270) | 1.0000 |
| 3 | (538, 118, 270) | 0.9995 | (538, 118, 270) | 1.0000 |
| 4 | (442, 133; 270) | 0.9986 | (442, 133; 270) | 1.0000 |
| 5 | (346, 147,; 270) | 0.9916 | (346, 147,; 270) | 1.0000 |
| 6 | (346, 147; 180) | 0.9489 | (346, 147; 180) | 0.9997 |
| 7 | (348, 230; 180) | 0.9491 | (348, 230; 180) | 0.9999 |
| 8 | (352, 393; 180) | 0.9436 | (352, 393; 180) | 0.9999 |
| 9 | (352, 393; 90) | 0.9177 | (352, 393; 90) | 0.9997 |
| 10 | (440, 400; 90) | 0.8668 | (440, 400; 90) | 0.9984 |
| 11 | (528, 407; 90) | 0.8573 | (528, 407; 90) | 0.9983 |
| 12 | (616, 414; 90) | 0.8411 | (616, 414; 90) | 0.9977 |
| 13 | (699, 420; 0) | 0.6475 | (699, 420; 0) | 0.8809 |
| 14 | (690, 327; 0) | 0.5270 | (690, 327; 0) | 0.8540 |
| 15 | (681, 232; 0) | 0.5182 | (681, 232; 0) | 0.8533 |
| 16 | (681, 232; 90) | 0.4441 | (681, 232; 90) | 0.8108 |
| 17 | (742, 234; 90) | 0.3656 | (742, 234; 90) | 0.6910 |
| 18 | (800, 235; 90) | 0.3538 | (800, 235; 90) | 0.6127 |

Table 9 illustrates the estimated location of the pedestrian provided by the invention utilizing the "incorrect" observations provided in Table 7 along with the associated probabilities for each time t. Recall that at time t=3, the sensors incorrectly detected that the pedestrian did not step and did not turn (0,0). Regardless of the inaccuracy of the detected events, both the estimated location and the re-estimated location of the pedestrian at time t=3 match the estimated and re-estimated location of the pedestrian at time 3 utilizing the "correct" observation. i.e.; using either the correct or incorrect observation at time t=3 it is estimated that the pedestrian's state is (538, 118, 270). Recall that at time t=9, the sensors incorrectly detect that the pedestrian did not turn. As indicated in Table 9, the estimated location of the pedestrian at time t=9 is initially determined to be (352, 393, 180) whereas the estimated location of the pedestrian provided in Table 8 using the accurate event information was determined to be (353, 393, 90). When re-estimation is provided, however, at time t=9, Table 9 indicates that the re-estimated location of the pedestrian is (352, 393, 90). Thus, when re-estimation was utilized the estimated location of the pedestrian using the "incorrect" event information provided by the sensors, was "corrected" and the estimated location of the pedestrian using the incorrect sensor information matches the estimated location using the correct sensor information.

TABLE 9

Re-estimated Location of the Pedestrian Using "Incorrect" Observations

| Time, t | $\widehat{X_t}$-Estimated Location | Max γ(i, t) | $\widehat{X_t}$-Estimated Location After re-estimation | Max γ(i, t) |
|---|---|---|---|---|
| 0 | (824, 75; 270) | 1 | (824, 75; 270) | 1 |
| 1 | (730, 89; 270) | 0.8948 | (730, 89; 270) | 0.9994 |
| 2 | (634, 104; 270) | 0.7829 | (634, 104; 270) | 0.9951 |
| 3 | (538, 118, 270) | 0.5102 | (538, 118, 270) | 0.9267 |
| 4 | (442, 133; 270) | 0.5246 | (442, 133; 270) | 0.9356 |
| 5 | (346, 147; 270) | 0.5343 | (346, 147; 270) | 0.9413 |
| 6 | (346, 147; 180) | 0.5801 | (346, 147; 180) | 0.9848 |
| 7 | (348, 230; 180) | 0.5952 | (348, 230; 180) | 0.9990 |
| 8 | (352, 393; 180) | 0.5531 | (352, 393; 180) | 0.9669 |
| 9 | (352, 393; 180) | 0.3368 | (352, 393; 90) | 0.8100 |
| 10 | (440, 400; 90) | 0.2551 | (440, 400; 90) | 0.9284 |
| 11 | (528, 407; 90) | 0.2571 | (528, 407; 90) | 0.9408 |
| 12 | (616, 414; 90) | 0.2540 | (616, 414; 90) | 0.9424 |
| 13 | (699, 420; 0) | 0.1969 | (699, 420; 0) | 0.8683 |
| 14 | (690, 327; 0) | 0.1607 | (690, 327; 0) | 0.8388 |
| 15 | (681, 232; 0) | 0.1580 | (681, 232; 0) | 0.8382 |
| 16 | (681, 232; 90) | 0.1355 | (681, 232; 90) | 0.8017 |
| 17 | (742, 234; 90) | 0.1116 | (742, 234; 90) | 0.6955 |
| 18 | (800, 235; 90) | 0.1080 | (800, 235; 90) | 0.6180 |

Viterbi

As noted above, the matrices A and B for the model may be used with the Viterbi algorithm in addition to or instead of the Baum-Welch. Rather than determining the state which the pedestrian is in at each particular time t (as is done with the Baum-Welch algorithm), the Viterbi algorithm is used to determine the most likely path taken by the pedestrian. The Viterbi algorithm computes the most likely sequence $\widehat{X_1} \ldots \widehat{X_t}$ given the set of detected events and the model.

With the Viterbi algorithm, V(i, t) is computed using a formula similar to the α(i, t) computation from the Baum-Welch algorithm, however, a maximum is calculated rather than a sum. Calculate the maximum, $V_1$(i, t) using:

$$V_1(i, t) = \max_k V_1(k, t-1) a_{ki} b_{k,i,ot}$$

and $$V_2(i, t) = \operatorname{argmax}_k V_1(k, t-1) a_{ki} b_{k,i,ot}$$

Return estimates for the states $\{\widehat{X_t}\}$ in reverse order:

$\widehat{X_t} = \operatorname{argmax}_k V_1(k,T)$, and we recursively compute:

$\widehat{X_{t-1}} = V_2(\widehat{X_t}, t)$.

If the Viterbi sequence has a point $\widehat{X}_t \neq X_t$, then in some applications, the Viterbi sequence tends to depart from the true sequence for some period of time near t.

As discussed above, the PDR device 400 includes a location/path estimator 428. The location/path estimator may be configured to provide $\widehat{X}_t$ as discussed above.

The Baum-Welch and the Viterbi algorithms can be used alone or together in various ways. For example, one might first use the Baum-Welch algorithm with a re-estimation step. Then, using the updated A, B matrices, the Viterbi algorithm could be applied. Alternatively, with either or both of these algorithms, a user could customize the output of the algorithm by selecting various subsets of the information produced. For example, the Baum-Welch provides the most likely state at each time t, and the Viterbi provides the most likely sequence of states. Additional information, however, is provided by each model. For example, during the calculations, the probabilities for all of the states are provided. Therefore, a user could output, for example, the top three most likely states and the associated probabilities for each state. Alternatively the user could output, the top three most likely sequence of states and the associated probabilities for each sequence. With a small example, success was experienced running the Baum-Welch algorithm twice (i.e., with two re-estimation steps) to improve the model followed by the Viterbi algorithm.

The present invention provides improved pedestrian dead reckoning (PDR) without requiring the use of improved sensors. For example, utilizing the probability of state transitions and the event probabilities, incorrectly observed events can be corrected. Furthermore, the present invention provides improved PDR without requiring the use of additional sensors, for example, GPS. The application of the Baum-Welch re-estimation step in this context allows for improvement over repeated use in a particular location and also accommodates imperfections in an initial image of the pedestrian environment. For example, the image of the floor plan may not distinguish walls and doorways. While initially, state transitions through doorways would be assigned low probabilities, if these were used repeatedly, then over time, the re-estimation would increase these probabilities.

Also, the invention provides probabilities for being in each state at each time. So in addition to traditional PDR where one estimates the most likely position of the user at a given time, this invention contains a probability distribution for the position and orientation of the user over all possible states at each time. When used in conjunction with another location-based utility or application, these probabilities allow one to weight the output of the PDR when used as input to another service.

The invention claimed is:

1. A method of identifying a location of a pedestrian within an environment comprising the steps of:
    identifying states relating to positions associated with an image of the environment to provide a collection of states;
    identifying pairs of said identified states, determining a Euclidean distance between said states of said identified pair; and determining based upon said Euclidean distance whether each identified pair is close or not close;
    for each pair of close states, determining a transition probability;
    for each pair of states identified as not close, setting said transition probability to zero;
    defining possible event observations;
    for each pair of close states, determining an event probability for each possible event observation;
    for a period of time and at time intervals, detecting a set of events;
    at each time interval, computing a state probability for each state based upon the transition probabilities and the event probabilities; and
    determining an estimated location of the pedestrian at each time interval based upon said computed state probabilities.

2. The method of claim 1 wherein each state of said collection of states includes a position and an orientation.

3. The method of claim 1, further including the steps of:
    identifying a mathematical graph representing the environment; and
    identifying positions on the mathematical graph.

4. The method of claim 1, wherein said step of determining whether states are close includes the steps of:
    selecting a closeness parameter; and
    comparing a distance between the identified states to the closeness parameter.

5. The method of claim 1, wherein the closeness parameter is based upon an estimated step size.

6. The method of claim 1, further including the steps of:
    determining whether said identified pairs are locally connected; and
    wherein said step of determining a transition probability includes the use of a locally connected constant and the value of said locally connected constant is selected based upon said determination of whether said identified pairs are locally connected.

7. The method of claim 6, wherein said step of determining whether said identified pairs are locally connected includes the steps of:
    determining a Euclidean distance between the identified states;
    determining a sum of the lengths of line segments joining the identified states; and
    comparing the determined Euclidean distance to the determined sum.

8. The method of claim 6, wherein said step of determining whether said identified pairs are locally connected includes the steps of:
    identifying a mathematical graph which represents the environment;
    identifying a line segment connecting the identified pair of states;
    identifying a plurality of points on said connecting line segment;
    at said identified points, identifying an intersecting line segment perpendicular to said connecting line segment, each said intersecting line segment having a defined length; and
    determining whether said intersecting line segments intersects said mathematical graph.

9. The method of claim 1, wherein said step of determining said transition probability includes the use of a vertex constant.

10. The method of claim 1, wherein said step of detell lining said transition probability includes the use of distance calibration constant.

11. The method of claim 1, wherein said step of determining said transition probability includes the use of turn calibration constant.

12. The method of claim 1, wherein said transition probability is determined using:

$$a_{ij} = c_1 * e^{-(w)^2/2(c_2)^2} * e^{-(r)^2/2(c_3)^2}$$

13. The method of claim 12,
wherein the value of said locally connected constant, $c_1$ is selected based upon said determination of whether said identified pairs are locally connected;
wherein w reflects a distance between an identified state and an auxiliary point;
wherein r reflects the difference between the orientations of states of the identified pair;
wherein $c_2$ reflects a distance calibration constant; and
wherein $c_3$ reflects a turn calibration constant.

14. The method of claim 1, wherein possible event observations are defined as ordered pairs representing the steps taken by the pedestrian selected from a pre-defined set of values and the turns made by the pedestrian selected from a pre-defined set of values.

15. The method of claim 1, wherein said event probability is determined by:

$$b(i,j,k) = e^{(\Delta_k - \Delta_{i,j})^2/2\sigma_1^2} * e^{-(\delta_k - \delta_{i,j})^2/2\sigma_2^2}$$

16. The method of claim 15,
wherein step events are detected using an accelerometer and turn events are detected utilizing a gyroscope;
wherein $\sigma_1$ represents a standard deviation relating to the accelerometer;
wherein $\sigma_2$ represents a standard deviation relating to the gyroscope;
wherein $\Delta_k$ represents the difference in position the observation would produce;
wherein $\delta_k$ represent the difference in orientation the observation would produce,
wherein $\Delta_{i,j}$ represents the change in distance between the identified states; and
wherein $\delta_{i,j}$ represents the change in orientation between the identified states.

17. The method of claim 1, wherein said step of computing the state probabilities is provided through application of a Baum-Welch algorithm.

18. The method of claim 1, wherein said step of computing the state probabilities is provided through application of a Viterbi algorithm.

19. The method of claim 1, further including a step of determining a re-estimated location of the pedestrian at each time.

20. The method of claim 19, wherein said step of determining a re-estimated location is provided through application of the Baum-Welch algorithm.

21. The method of claim 1 further including the steps of:
creating a mathematical graph based on the image of the environment; and
identifying the positions associated with the environment.

22. A method of identifying a path taken by a pedestrian within an environment comprising the steps of:
identifying states relating to positions associated with an image of the environment to provide a collection of states;
identifying pairs of said identified states, determining a Euclidean distance between said states of said identified pair and determining based on said Euclidean distance whether each identified pair is close or not close;
for each pair of close states, determining a transition probability;
for each pair of states identified as not close, setting said transition probability to zero;
defining possible event observations;
for each pair of close states, determining an event probability;
for a period of time and at time intervals, detecting a set of events; and
computing an estimated sequence of the states based upon the transition probability and the event probability.

23. A location device for identifying, the location of a pedestrian within an environment comprising:
a processing unit for receiving and storing identified positions associated with an image of the environment, a collection of states, and potential event observations;
a close state determiner in communication with said processing unit for receiving state information and for determining, whether pairs of states are close based upon a Euclidean distance between said states;
a transition probability calculator in communication with said processing unit for calculating a state transition probability for each said close pairs of states;
a potential observation identifier in communication with said processing unit for determining a set of potential observations;
an event probability calculator in communication with said processing unit for calculating an event probability for each potential observation and each state transition probability;
an event detector in communication with said processing unit for detecting the occurrence of an event; and
a state probability calculator in communication with said processing unit for computing state probabilities for each state based upon the transition probabilities and the event probabilities for each state.

24. The location device of claim 23, wherein a state transition probability for each pair of states determined to be not close is set to zero.

25. The location device of claim 23, further comprising a locally connected determiner in communication with said processing unit for determining, whether pairs of states are locally connected.

26. The location device of claim 23, further comprising a vertex weighting calculator in communication with said processing unit for determining whether each identified position represents a vertex and wherein said transition probability is based upon said vertex determination.

27. The location device of claim 23, further comprising a calibrator in communication with said processing unit for calibrating said transition probability calculator.

28. The location device of claim 23, further comprising:
a location estimator in communication with said processing unit, where said location estimator estimates a location of the pedestrian at each time interval based upon said computed state probabilities.

29. The location device of claim 23, further comprising:
a location estimator in communication with said processing unit, where said location estimator estimates a path of the pedestrian within the environment based upon said computed state probabilities.

30. The location device of claim 28, further comprising:
a location re-estimator in communication with said processing unit, where said location estimator re-estimates a location of the pedestrian at each time interval based upon said computed state probabilities.

31. The method of claim 1, wherein said step of determining an estimated location is based on inertial measurements.

32. The method of claim 31, wherein said inertial measurements are provided by an accelerometer.

33. The method of claim 31, wherein said inertial measurements are provided by a gyroscope.

\* \* \* \* \*